(12) United States Patent
McKiel, Jr.

(10) Patent No.: US 8,553,071 B2
(45) Date of Patent: Oct. 8, 2013

(54) METHODS AND SYSTEMS FOR PRESENTING ADJUNCT CONTENT DURING A PRESENTATION OF A MEDIA CONTENT INSTANCE

(75) Inventor: Frank A. McKiel, Jr., Colorado Springs, CO (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 417 days.

(21) Appl. No.: 12/912,022

(22) Filed: Oct. 26, 2010

(65) Prior Publication Data
US 2012/0098929 A1    Apr. 26, 2012

(51) Int. Cl.
*H04N 13/00*    (2006.01)

(52) U.S. Cl.
USPC .......................................................... 348/43

(58) Field of Classification Search
USPC ................. 348/563–565, 56, 46; 375/240.26
See application file for complete search history.

(56) References Cited

U.S. PATENT DOCUMENTS

| | | | |
|---|---|---|---|
| 5,978,046 A * | 11/1999 | Shintani ...................... | 348/589 |
| 7,164,779 B2 * | 1/2007 | Yerazunis et al. ........... | 382/100 |
| 2006/0109377 A1 * | 5/2006 | Chao ............................ | 348/448 |
| 2007/0053513 A1 * | 3/2007 | Hoffberg ..................... | 380/201 |
| 2007/0139519 A1 * | 6/2007 | DeCusatis et al. ........... | 348/58 |
| 2007/0171275 A1 * | 7/2007 | Kenoyer .................. | 348/14.08 |
| 2007/0263003 A1 * | 11/2007 | Ko et al. ..................... | 345/502 |
| 2008/0192067 A1 * | 8/2008 | Barenbrug et al. .......... | 345/607 |
| 2008/0235749 A1 | 9/2008 | Jain et al. | |
| 2009/0073108 A1 * | 3/2009 | Gorog ......................... | 345/102 |
| 2009/0193457 A1 | 7/2009 | Conn | |
| 2009/0322857 A1 * | 12/2009 | Jacobs et al. ................. | 348/42 |
| 2010/0079676 A1 | 4/2010 | Kritt et al. | |
| 2010/0226628 A1 * | 9/2010 | Yamaji et al. ............... | 386/108 |
| 2010/0251087 A1 * | 9/2010 | Matsui ....................... | 715/205 |
| 2011/0258585 A1 * | 10/2011 | Reponen et al. ............. | 715/844 |

* cited by examiner

*Primary Examiner* — Nhon Diep

(57) ABSTRACT

An exemplary method includes an adjunct content presentation system sequentially presenting a first main content image of a media content instance, a first adjunct content image comprising adjunct content having a pixel value greater than a predetermined neutral pixel value, a second adjunct content image comprising the adjunct content having a pixel value less than the predetermined neutral pixel value, and a second main content image of the media content instance. The pixel values of the adjunct content of the first and second adjunct content images are configured to result in the adjunct content being substantially imperceptible to a viewer not wearing active shutter three-dimensional viewing glasses during the sequential presentation of the first main content image, the first adjunct content image, the second adjunct content image, and the second main content image. Corresponding methods and systems are also disclosed.

22 Claims, 17 Drawing Sheets

METHODS AND SYSTEMS FOR PRESENTING ADJUNCT CONTENT DURING A PRESENTATION OF A MEDIA CONTENT INSTANCE

BACKGROUND INFORMATION

Viewers of movies, television programs, and other types of media content often differ in the amount and/or type of additional information they would like to see while watching the media content. For example, some people prefer to see subtitles when watching a movie or television program while others do not. As another example, some people like to see ticker tape information (e.g., sports scores, news, stock updates, etc.) scrolling across the bottom of a television screen while others consider such information to be distracting or annoying. When more than one person watches media content displayed by a single display device at the same time (e.g., when a family watches a movie or television program together), these differences in viewing preferences can cause dissatisfaction, disagreement, and even contention among those watching the media content.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
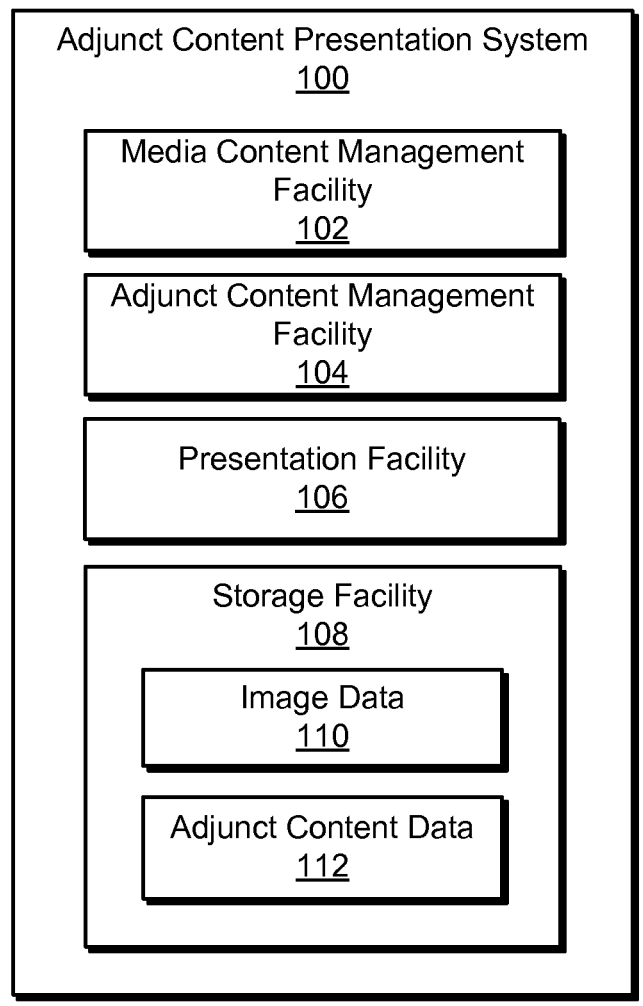
FIG. 1 illustrates an exemplary adjunct content presentation system according to principles described herein.

Methods and systems for presenting adjunct content during a presentation of a media content instance are described herein. In some examples, an adjunct content presentation system may sequentially present a first main content image of a media content instance, a first adjunct content image comprising adjunct content having a pixel value greater than a predetermined neutral pixel value, a second adjunct content image comprising the adjunct content having a pixel value less than the predetermined neutral pixel value, and a second main content image of the media content instance. The pixel values of the adjunct content included in the first and second adjunct content images may be configured to result in the adjunct content being substantially imperceptible to a viewer not wearing active shutter three-dimensional ("3D") viewing glasses during the sequential presentation of the first main content image, the first adjunct content image, the second adjunct content image, and the second main content image.

As will be described in more detail below, the adjunct content presentation system may be further configured to facilitate selective perception of the adjunct content by one or more viewers wearing active shutter 3D viewing glasses. For example, the adjunct content presentation system may render the adjunct content substantially imperceptible to a viewer wearing active shutter 3D viewing glasses by directing the active shutter 3D viewing glasses to operate in accordance with one or more specific types of duty cycle configurations, examples of which will be described in detail below. On the other hand, the adjunct content presentation system may allow the viewer to perceive the adjunct content by directing the active shutter 3D viewing glasses to operate in accordance with one or more other types of duty cycle configurations, examples of which will also be described in detail below.

Hence, the methods and systems described herein may allow some viewers to watch a media content instance without seeing adjunct content displayed therewith. At the same time, the methods and systems described herein may allow other viewers to see adjunct content while watching the media content instance. In this manner, divergent viewing preferences of multiple viewers concurrently watching a media content instance being displayed on a particular display screen (e.g., in a theatre or in the home) may be satisfied.

As used herein, the term "adjunct content" refers to any content that may be displayed concurrently with a media content instance on a display screen. In some examples, the adjunct content may be related to the media content instance. To illustrate, the adjunct content may include subtitle content associated with the media content instance (e.g., closed captioning content), enhanced content associated with the media content instance (e.g., commentary, statistics, elapsed time information, remaining time information, content associated with a video game, metadata, and/or any other type of information associated with the media content instance), and/or any other type of content related to the media content instance. Additionally or alternatively, the adjunct content may be unrelated to the media content instance. Examples of such unrelated adjunct content include, but are not limited to, ticker tape information (e.g., sports scores, news, and/or stock updates), messaging content (e.g., text messages intended for one or more viewers of the media content instance), notification content (e.g., notifications alerting a viewer of an incoming telephone call), and/or any other content unrelated to the media content instance as may serve a particular implementation. Adjunct content may include text, one or more images, or a combination thereof. For illustrative purposes only, it will be assumed in the examples given herein that adjunct content includes only text.

As used herein, "media content" may refer generally to any video content that may be presented to one or more viewers. The term "media content instance" will be used herein to refer to any video, movie, television program, on-demand media program, pay-per-view media program, broadcast media program (e.g., broadcast television program), IPTV media content, video game, advertisement, image, or any segment, component, or combination of these or other forms of media content that may be viewed by one or more viewers. A media content instance may include two-dimensional ("2D") video content and/or 3D video content.

As used herein, the term "pixel value" may be representative of or refer to any visual attribute of adjunct content (or a group of pixels representative of the adjunct content) that may be included in an image that is presented to one or more viewers. For example, a pixel value may be representative of a brightness level, a color value, a hue value, a saturation value, and/or any other visual attribute of adjunct content as may serve a particular implementation. For illustrative purposes only, the examples given herein will be explained in terms of brightness level.

FIG. 1 illustrates an exemplary adjunct content presentation system 100 (or simply "system 100"). As will be described in more detail below, system 100 may be configured to facilitate selective perception of adjunct content by one or more viewers of a media content instance.

System 100 may include, but is not limited to, a media content management facility 102, an adjunct content management facility 104, a presentation facility 106, and a storage facility 108, which may be in communication with one another using any suitable communication technologies. It will be recognized that, although facilities 102-108 are shown to be separate facilities in FIG. 1, any of those facilities may be combined into a single facility as may serve a particular application.

Media content management facility 102 may be configured to manage (e.g., generate, maintain, provide, etc.) media content that may be displayed on a display screen. A particular media content instance may include main content (as opposed to adjunct content) and may be presented in the form of a plurality of sequentially presented images representative of the media content instance.

In some examples, an image may be presented by sequentially presenting a first main content image and a second main content image each comprising content representative of a distinct perspective of the image. When viewed by a viewer wearing appropriately configured 3D viewing glasses, the combined perspectives of the first and second main content images may result in the viewer perceiving the first and second main content images as a single 3D composite image. When viewed by a viewer not wearing 3D viewing glasses, the first and second main content images may be perceived as a single 2D composite image, which, in some instances, might appear to be slightly blurry if the media content instance is intended to be viewed in 3D.

Adjunct content management facility 104 may be configured to manage (e.g., generate, maintain, provide, etc.) adjunct content that may be displayed concurrently with a media content instance on a display screen. For example, adjunct content management facility 104 may generate or otherwise provide a first adjunct content image and a second adjunct content image each including the same adjunct content. However, a pixel value (e.g., a brightness level) of the adjunct content included in the first adjunct content image may be set to be greater than a predetermined neutral pixel value (e.g., a predetermined neutral brightness level) while the pixel value (e.g., the brightness level) of the adjunct content included in the second adjunct content image may be set to be less than the predetermined neutral pixel value. As will be described in more detail below, the pixel values of the adjunct content included in the first and second adjunct content images, respectively, may be configured to result in the adjunct content being perceptible to only those viewers wearing appropriately configured active shutter 3D viewing glasses during a sequential presentation of a first main content image, the first adjunct content image, the second adjunct content image, and a second main content image.

In some examples, as will be described in more detail below, adjunct content management facility 104 may include the adjunct content in the first adjunct content image by setting a pixel value of a first group of pixels included in the first adjunct content image to be greater than the predetermined neutral pixel value. Likewise, adjunct content management facility 104 may include the adjunct content in the second adjunct content image by setting a pixel value of a second group of pixels included in the second adjunct content image and corresponding to the first group of pixels to be less than the predetermined neutral pixel value. Alternatively, adjunct content management facility 104 may include the adjunct content in the first and second adjunct content images by setting a pixel value of the first group of pixels included in the first adjunct content image to be less than the predetermined neutral pixel value and a pixel value of the second group of pixels included in the second adjunct content image to be greater than the predetermined neutral pixel value.

Adjunct content management facility 104 may facilitate perception of the adjunct content by a viewer wearing active shutter 3D viewing glasses by appropriately configuring a duty cycle associated with an opening and closing of first and second shutters that are a part of the active shutter 3D viewing glasses. Exemplary manners in which a duty cycle associated with an opening and closing of first and second shutters that are a part of active shutter 3D viewing glasses may be configured to allow a user of the glasses to perceive adjunct content will be described in more detail below.

Presentation facility 106 may be configured to present media content provided by media content management facility 102 and adjunct content provided by adjunct content management facility 104 to one or more viewers. For example, presentation facility 106 may sequentially present the first main content image provided by media content management facility 102, the first adjunct content image provided by adjunct content management facility 104, the second adjunct content image provided by adjunct content management facility 104, and the second main content image provided by media content management facility 102, in that order and in accordance with an active shutter processing technique. As used herein, an "active shutter processing technique" refers to a method of presenting media content in 3D wherein images are sequentially presented to the left and right eyes of a viewer wearing active shutter 3D viewing glasses. The active shutter 3D viewing glasses, as will be described in more detail below, may be configured to allow only some of the images to be presented to the left eye and only some of the images to be presented to the right eye. The images may be presented in rapid enough succession that the viewer does not notice that different images are being presented to each eye at slightly different times. The net effect is that the left eye sees only the images presented to the left eye and the right eye sees only the images presented to the right eye, thereby creating a perception of 3D in the viewer's brain. An exemplary active shutter processing technique will be described in more detail below.

In some examples, presentation facility 106 may provide the first main content image, the first adjunct content image, the second adjunct content image, and the second main content image for display on a display screen. The display screen may be located within a theatre or other venue, included as part of a television or other personal media content presentation device, and/or otherwise implemented.

Storage facility 108 may be configured to maintain image data 110 representative of one or more images included in a media content instance managed by media content management facility 102 and adjunct content data 112 representative of adjunct content managed by adjunct content management facility 104. Storage facility 108 may maintain additional or alternative data as may serve a particular implementation.

In some examples, system 100 may be implemented using components typically used to present media content in 3D. Hence, an exemplary 3D content presentation system and an exemplary 3D media content processing technique that may be used in accordance with the systems and methods described herein will now be described.

Figure 2:
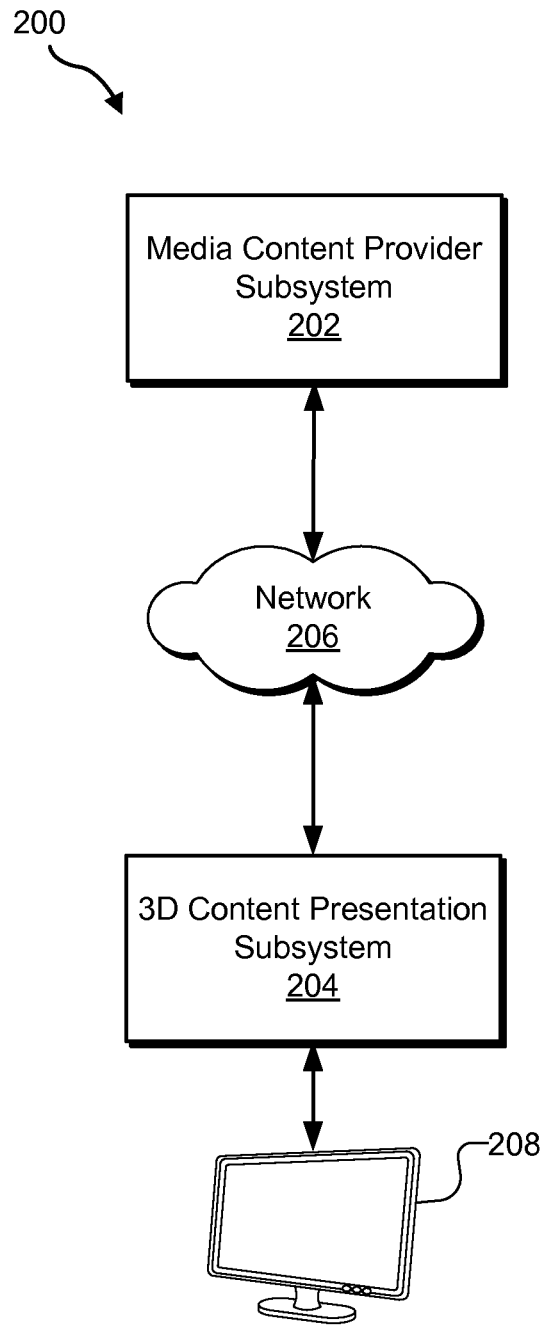
FIG. 2 illustrates an exemplary three-dimensional ("3D") content presentation system according to principles described herein.

FIG. 2 illustrates an exemplary 3D content presentation system 200 that may implement system 100. 3D content presentation system 200 may include a media content provider subsystem 202 (or simply "provider subsystem 202") and a 3D content presentation subsystem 204 in communication with one another via a network 206. Media content management facility 102, adjunct content management facility 104, presentation facility 106, and storage facility 108 may each be implemented on one or both of provider subsystem 202 and 3D content presentation subsystem 204.

Provider subsystem 202 and 3D content presentation subsystem 204 may communicate using any suitable communication technologies, devices, networks, media, and protocols supportive of remote data communications. For example, provider subsystem 202 and 3D content presentation subsystem 204 may communicate over network 206 using any communication platforms and technologies suitable for transporting media content and/or communication signals, including known communication technologies, devices, transmission media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Markup Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, radio frequency ("RF") signaling technologies, wireless communication technologies (e.g., Bluetooth, Wi-Fi, etc.), optical transport and signaling technologies, live transmission technologies (e.g., media streaming technologies), media file transfer technologies, in-band and out-of-band signaling technologies, and other suitable communications technologies.

Network 206 may include one or more networks or types of networks (and communication links thereto) capable of carrying communications, media content, and/or data signals between provider subsystem 202 and 3D content presentation subsystem 204. For example, network 206 may include, but is not limited to, one or more wireless networks (e.g., satellite media broadcasting networks or terrestrial broadcasting networks), mobile telephone networks (e.g., cellular telephone networks), closed media networks, open media networks, subscriber television networks (e.g., broadcast, multicast, and/or narrowcast television networks), closed communication networks, open communication networks, satellite networks, cable networks, hybrid fiber coax networks, optical fiber networks, broadband networks, narrowband networks, the Internet, wide area networks, local area networks, public networks, private networks, packet-switched networks, and any other networks capable of carrying data and/or communications signals between provider subsystem 202 and 3D content presentation subsystem 204. Communications between provider subsystem 202 and 3D content presentation subsystem 204 may be transported using any one of above-listed networks, or any combination or sub-combination of the above-listed networks.

While FIG. 2 shows provider subsystem 202 and 3D content presentation subsystem 204 communicatively coupled via network 206, it will be recognized that provider subsystem 202 and 3D content presentation subsystem 204 may be configured to communicate one with another in any other suitable manner (e.g., via a direct connection).

In some examples, provider subsystem 202 may be configured to generate or otherwise provide media content (e.g., in the form of one or more media content streams) to 3D content presentation subsystem 204. Provider subsystem 202 may additionally be configured to provide adjunct content to 3D content presentation subsystem 204.

3D content presentation subsystem 204 may be configured to present media content received from provider subsystem 202. 3D content presentation subsystem 204 may additionally or alternatively be configured to present adjunct content received from provider subsystem 202, generated by 3D content presentation subsystem 204, and/or received from any other source.

As shown in FIG. 2, 3D content presentation subsystem 204 may be communicatively coupled to a display device 208. Exemplary display devices 208 include, but are not limited to, televisions, computer monitors, handheld computing devices with display screens, mobile devices (e.g., mobile phones), and/or any other device comprising a display screen on which media content may be displayed. 3D content presentation subsystem 204 may present media content and/or adjunct content by way of display device 208.

In certain embodiments, system 100 may be implemented entirely by or within provider subsystem 202 or 3D content presentation subsystem 204. In other embodiments, components of system 100 may be distributed across provider subsystem 202 and 3D content presentation subsystem 204. For example, 3D content presentation subsystem 204 may include a client (e.g., a client application) implementing one or more of the facilities of system 100.

Provider subsystem 202 may be implemented by one or more computing devices. For example, provider subsystem 202 may be implemented by one or more server devices. Additionally or alternatively, 3D content presentation subsystem 204 may be implemented as may suit a particular implementation. For example, 3D content presentation subsystem 204 may be implemented by one or more media content presentation devices, which may include, but are not limited to, a media content projector device, a set-top box device, a DVR device, a media content processing device (e.g., a DVD player), a communications device, a mobile access device (e.g., a mobile phone device, a handheld device, a laptop computer, a tablet computer, a personal-digital assistant device, etc.), a personal computer, a gaming device, a television device, and/or any other device configured to perform one or more of the processes and/or operations described herein.

Figure 3:
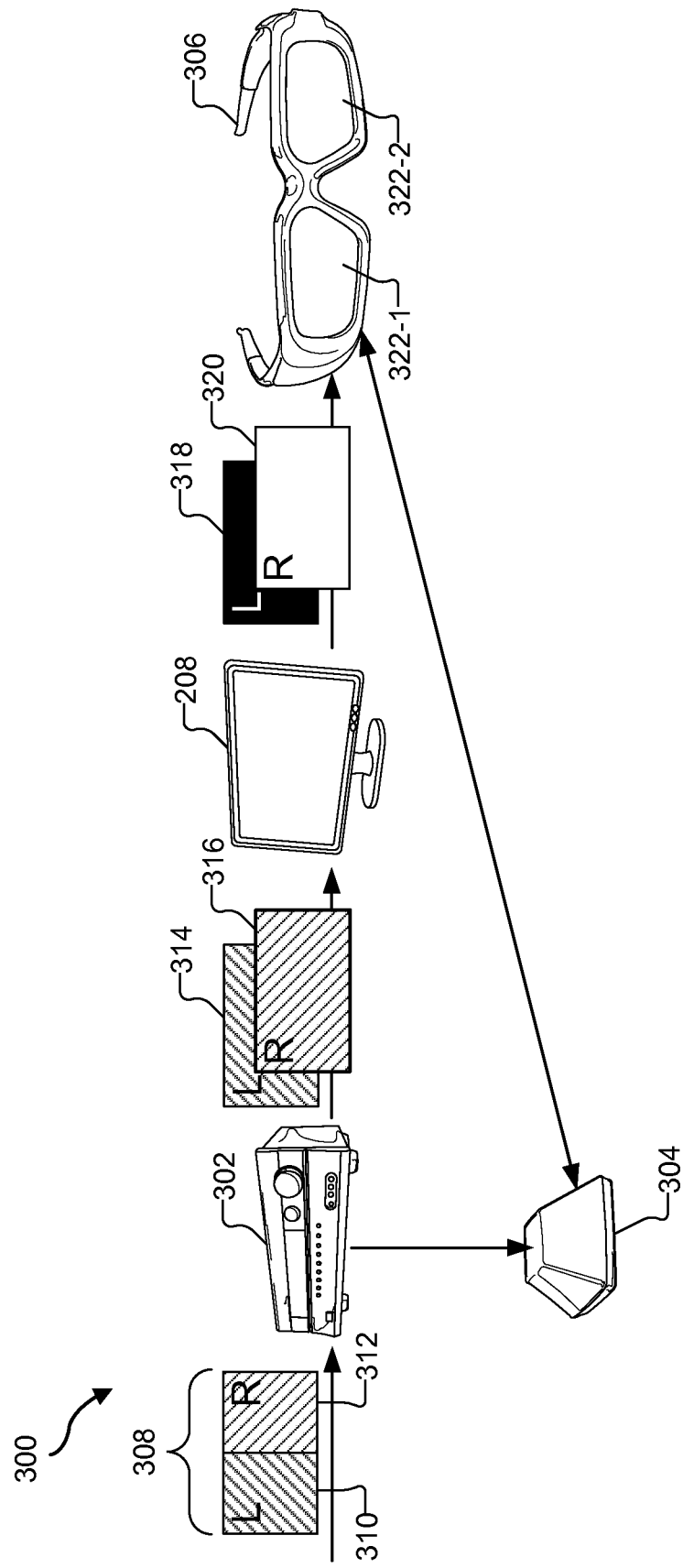
FIG. 3 illustrates an exemplary implementation of the system of FIG. 2 wherein an active shutter processing technique is used to present 3D video content to a viewer according to principles described herein.

FIG. 3 illustrates an exemplary implementation 300 of system 200 wherein an active shutter processing technique is used to present 3D video content to a viewer. As shown in FIG. 3, implementation 300 may include a 3D processing device 302 in communication with display device 208. 3D processing device 302 may be further communicatively coupled to an infrared ("IR") transmitter 304, which may be configured to control an operation of active shutter 3D viewing glasses 306.

3D processing device 302 may include any suitable computing device (e.g., one or more media content projector devices, set-top box devices, personal computers, etc.) configured to be able to present media content in 3D (i.e., 3D processing device 302 has the ability to present different images to the left and right eyes). 3D processing device 302 may be configured to receive a 3D video content stream, which, as shown in FIG. 3, may include a video frame 308 comprising data 310 representative of a left image intended for a left eye of a viewer and data 312 representative of a right image intended for a right eye of the viewer. Data 310 and 312 may be included and/or arranged in video frame 308 in any suitable manner.

As mentioned, in an active shutter processing technique, distinct left and right images are presented to the left and right eyes, respectively, in an alternating manner. To this end, 3D processing device 302 may be configured to process video frame 308 and generate a left image frame 314 comprising the data representative of the left image and a right image frame 316 comprising the data representative of the right image. 3D processing device 302 may then transmit left and right image frames 314 and 316 to display device 208. Display device 208 may use left and right image frames 314 and 316 to sequentially display a left image 318 and a right image 320.

In some examples, left and right image frames 314 and 316 are provided to display device 208 by 3D processing device 302 for presentation at a presentation rate at least twice the transmission rate at which video frame 308 is received by 3D processing device 302. For example, 3D processing device 302 may receive video frame 308 at a transmission rate of 60 frames/second. In this example, 3D processing device 302 may provide left and right image frames 314 and 316 to display device 208 for presentation at a presentation rate of at least 120 frames/second. In this manner, the sequentiality of the display of left and right images 318 and 320 may go substantially unnoticed to the viewer, thereby resulting in a seamless 3D video content viewing experience for the viewer.

A viewer of left and right images 318 and 320 may wear active shutter 3D viewing glasses 306 in order to perceive images 318 and 320 as a single 3D image. Active shutter 3D viewing glasses 306 may include a right lens 322-1 and a left lens 322-2 (collectively referred to herein as "lenses 322"). Each lens 322 may be configured to act as a shutter (using, for example, liquid crystal technology) or may have a shutter associated therewith. For illustrative purposes only, it will be assumed in the examples given herein that each lens 322 has a shutter associated therewith. Each shutter may be electrically controlled to selectively close in order to momentarily obscure the view through its respective lens 322. For example, a right shutter associated with right lens 322-1 may be configured to be closed (e.g., effectively opaque) during the display of left image 318 and open (e.g., effectively transparent) during the display of right image 320. Likewise, a left shutter associated with left lens 322-2 may be configured to be closed during the display of right image 320 and open during the display of left image 318. In this manner, only the left image 318 is presented to the left eye and only the right image 320 is presented to the right eye.

IR transmitter 304 may be configured to control the opening and closing of the left and right shutters. To this end, IR transmitter 304 may receive information from 3D processing device 302 that indicates when either left or right images 318 or 320 is to be displayed by display device 208 and direct the left and right shutters to open and close accordingly. IR transmitter 304 may include any suitable combination of hardware and/or software and may be separate from 3D processing device 302, as shown in FIG. 3. Alternatively, IR transmitter 304 may be integrated into 3D processing device 302 in any suitable manner. Moreover, it will be recognized that any other type of transmission link (e.g., Bluetooth, a lowe power radio transmitter, etc.) may be used in place of IR transmitter 304.

The active shutter processing technique described in connection with FIG. 3 is exemplary of the many different active shutter processing techniques that may be used in connection with the methods and systems described herein. As will be described in more detail below, one or more variations of the active shutter processing technique described in connection with FIG. 3 may be used to facilitate selective perception of adjunct content by a viewer during a presentation of a media content instance.

Figure 4:
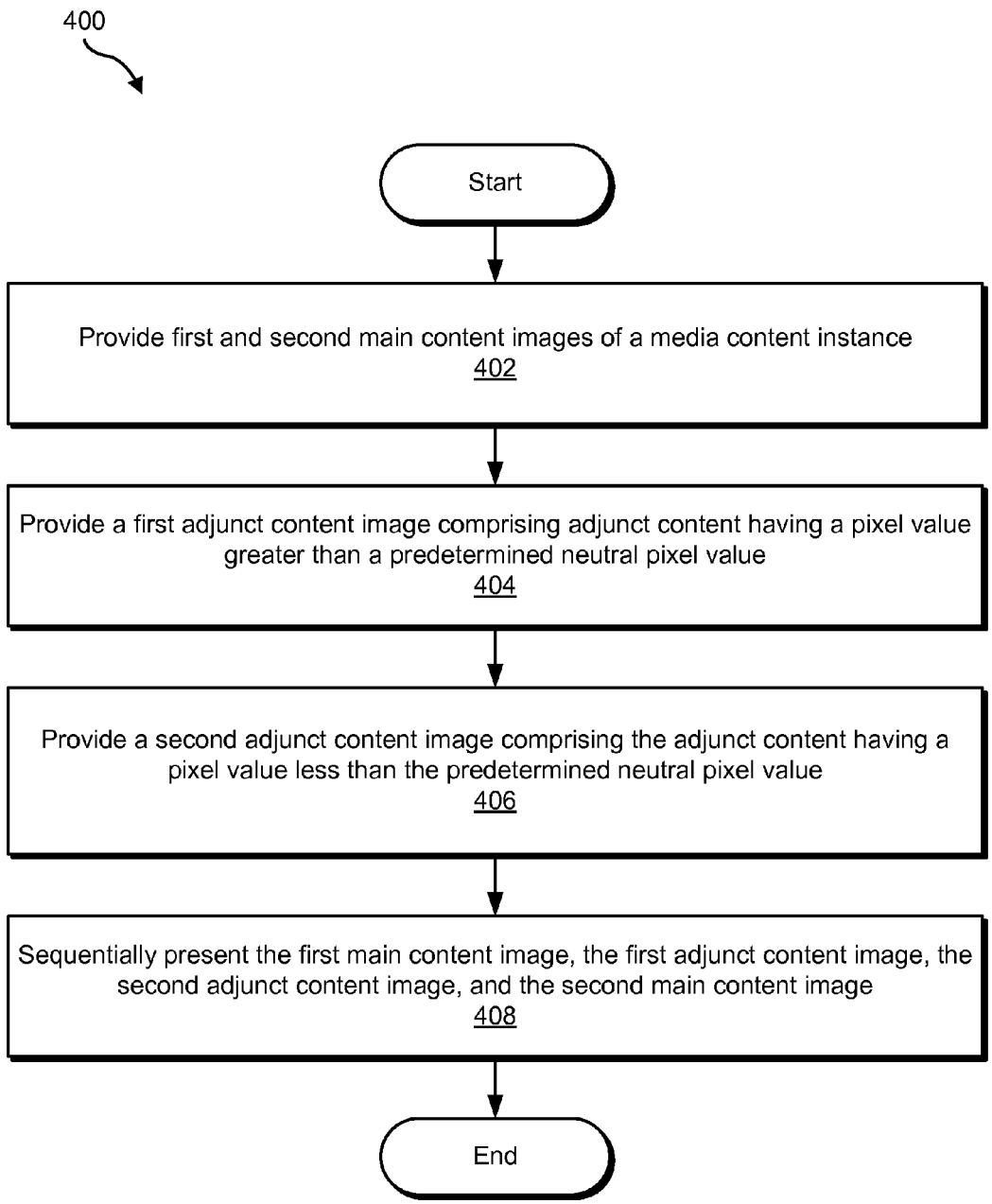
FIG. 4 illustrates an exemplary method of presenting adjunct content during a presentation of a media content instance according to principles described herein.

FIG. 4 illustrates an exemplary method 400 of presenting adjunct content during a presentation of a media content instance. While FIG. 4 illustrates exemplary steps according to one embodiment, other embodiments may omit, add to, reorder, and/or modify any of the steps shown in FIG. 4. The steps shown in FIG. 4 may be performed by any component or combination of components of system 100, media content provider subsystem 202, 3D content presentation subsystem 204, and/or 3D content processing device 302.

In step 402, first and second main content images of a media content instance are provided. As described above, the first and second main content images may each comprise a distinct portion of a single image that may be perceived by a viewer in 3D with appropriately configured active shutter 3D viewing glasses. Alternatively, the first and second main content images may each comprise the same content such that they are perceived as a single 2D image when viewed with or without active shutter 3D viewing glasses.

In some examples, the first main content image includes a left image similar to the left images described herein and the second main content image includes a right image similar to the right images described herein. Alternatively, the first main content image includes a right image similar to the right images described herein and the second main content image includes a left image similar to the left images described herein.

In step 404, a first adjunct content image comprising adjunct content having a pixel value greater than a predetermined neutral pixel value is provided. As described above, the adjunct content may be included within the first adjunct content image by setting a pixel value of a first group of pixels included in the first adjunct content image to be greater than the predetermined neutral pixel value.

In step 406, a second adjunct content image comprising the adjunct content having a pixel value less than a predetermined neutral pixel value is provided. As described above, the adjunct content may be included within the second adjunct content image by setting a pixel value of a second group of pixels included in the second adjunct content image and corresponding to the first group of pixels to be at less than the predetermined neutral pixel value.

In step 408, the first main content image, the first adjunct content image, the second adjunct content image, and the second main content image are sequentially presented. It will be recognized that first main content image, the first adjunct content image, the second adjunct content image, and the second main content image may be presented in any alternative order as may serve a particular implementation.

In some examples, the adjunct content included in the first and second adjunct content images provided in steps 404 and 406 is configured to be perceptible to some viewers while at the same time being substantially imperceptible to other viewers. Various examples of the adjunct content being perceptible to some viewers while at the same time being substantially imperceptible to other viewers will now be described.

Figure 5:
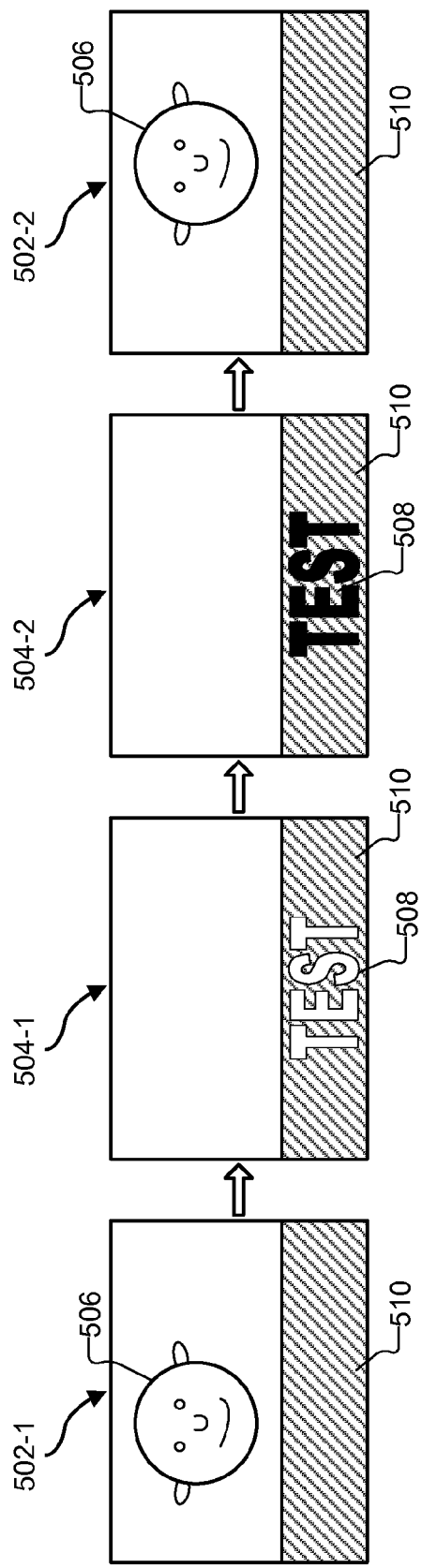
FIG. 5 illustrates an exemplary sequential presentation of a first main content image, a first adjunct content image, a second adjunct content image, and a second main content image according to principles described herein.

FIG. 5 illustrates an exemplary sequential presentation of a first main content image 502-1, a first adjunct content image 504-1, a second adjunct content image 504-2, and a second main content image 502-2. First and second main content images 502-1 and 502-2 will be referred to collectively as "main content images 502," and first and second adjunct content images 504-1 and 504-2 will be referred to collectively as "adjunct content images 504." Sequential presentation of first main content image 502-1, first adjunct content image 504-1, second adjunct content image 504-2, and second main content image 502-2 at a sufficiently high transmission rate may result in a viewer perceiving a single composite image. As will be described in more detail below, the contents of the perceived composite image may vary depending on the particular active shutter processing technique employed during the presentation of main content images 502 and adjunct content images 504.

Main content images 502 may each include or portray a different perspective of a particular media content image 506 included in a media content instance. In this manner, a viewer may perceive media content image 506 in 3D with appropriately configured active shutter 3D viewing glasses. Alternatively, the viewer may perceive media content image 506 in 2D.

Adjunct content images 504 may each have adjunct content 508 included therein. In FIG. 5, adjunct content 508 includes the word "test" for illustrative purposes only. It will be recognized that adjunct content 508 may include any other type of adjunct content described herein as may serve a particular implementation. As will be explained below, sequential presentation of first and second adjunct content images 504 to a viewer able to view both adjunct content images 504 or neither one of adjunct content images 504 may cause the viewer to perceive a single composite image without adjunct content 508 included therein. At the same time, the sequential presentation of first and second adjunct content images 504 to an additional viewer able to view only one of adjunct content images 504 may cause the additional viewer to perceive an image having adjunct content 508 included therein.

Adjunct content 508 may be included in first and second adjunct content images 504-1 and 504-2 by setting a brightness level of corresponding groups of pixels (i.e., pixels corresponding to the same locations within each adjunct content image 504) included in first and second adjunct content images 504-1 and 504-2, respectively, to be above and below a predetermined neutral brightness level. The predetermined neutral brightness level may include any neutral brightness level (e.g., a neutral gray color) as may serve a particular implementation.

For example, FIG. 5 shows that adjunct content 508 included in first adjunct content image 504-1 has a brightness level that has been set to be above a predetermined neutral brightness level while adjunct content 508 included in second adjunct content image 504-2 has a brightness level that has been set to be below the predetermined neutral brightness level. The brightness levels of the pixels associated with adjunct content 508 included in each adjunct content image 504 may be set to effectively cancel each other out when perceived by a viewer viewing both adjunct content images 504, thereby rendering adjunct content 508 substantially imperceptible to the viewer in the single composite image.

To illustrate, the brightness level of the pixels associated with adjunct content 508 included in first adjunct content image 504-1 may be set to be substantially equal to one brightness unit greater than the predetermined neutral brightness level and the brightness level of the pixels associated with adjunct content 508 included in second adjunct content image 504-2 may be set to be substantially equal to one brightness unit less than the predetermined neutral brightness level. As used herein, a "brightness unit" refers to any unit or measure of brightness or luminance as may serve a particular implementation. When viewed by a viewer able to view both adjunct content images 504, the brightness units may cancel each other out, thereby causing the viewer to perceive a corresponding group of pixels in the single composite image as having the predetermined neutral brightness level.

Additionally or alternatively, any other pixel value of adjunct content 508 may be set to be any number of pixel value units above or below a predetermined neutral pixel value. For example, a color value of the pixels associated with adjunct content 508 included in first adjunct content image 504-1 may be set to be greater than a predetermined color value and a color value level of the pixels associated with adjunct content 508 included in second adjunct content image 602-2 may be set to be less than the predetermined color value such that when viewed by a viewer able to view both images 602, the color values may cancel each other out, thereby causing the viewer to perceive a corresponding group of pixels the single composite image as having the predetermined color value. For illustrative purposes, however, it will be assumed that only the brightness level of the pixels representative of adjunct content 508 are set in accordance with the methods and systems described herein.

It will be recognized that the brightness levels of the pixels associated with adjunct content 508 included in both adjunct content images 504 may be adjusted or set by system 100 to compensate for non-linear response, habituation, and variable response times of the human vision system. For example, system 100 may periodically switch between including "light" and "dark" adjunct content in adjunct content images 504. To illustrate, after a predetermined time period, system 100 may switch from assigning "light" adjunct content to first adjunct content images and "dark" adjunct content to second adjunct content images to assigning "dark" adjunct content to first adjunct content images and "light" adjunct content to second adjunct content images.

In some examples, as shown in FIG. 5, adjunct content 508 may be located within a neutral field 510 included in each of adjunct content images 504. Neutral field 510 may be additionally included in each of main content images 502, as shown in FIG. 5. Neutral field 510 may be located within one of the margins or "pillars" that are often displayed when the aspect ratio of a media content instance is different than that of the display screen. However, it will be recognized that neutral field 510 may be located at any position within adjunct content images 504 and main content images 502 as may serve a particular implementation.

A pixel value (e.g., a brightness level) of neutral field 510 may be set to be substantially equal to the predetermined neutral pixel value. In this manner, the cancelation of the pixel values of the pixels associated with adjunct content 508 included in each adjunct content image 504 may cause neutral field 510 to appear apparently void of adjunct content 508 to a viewer.

Figure 6:
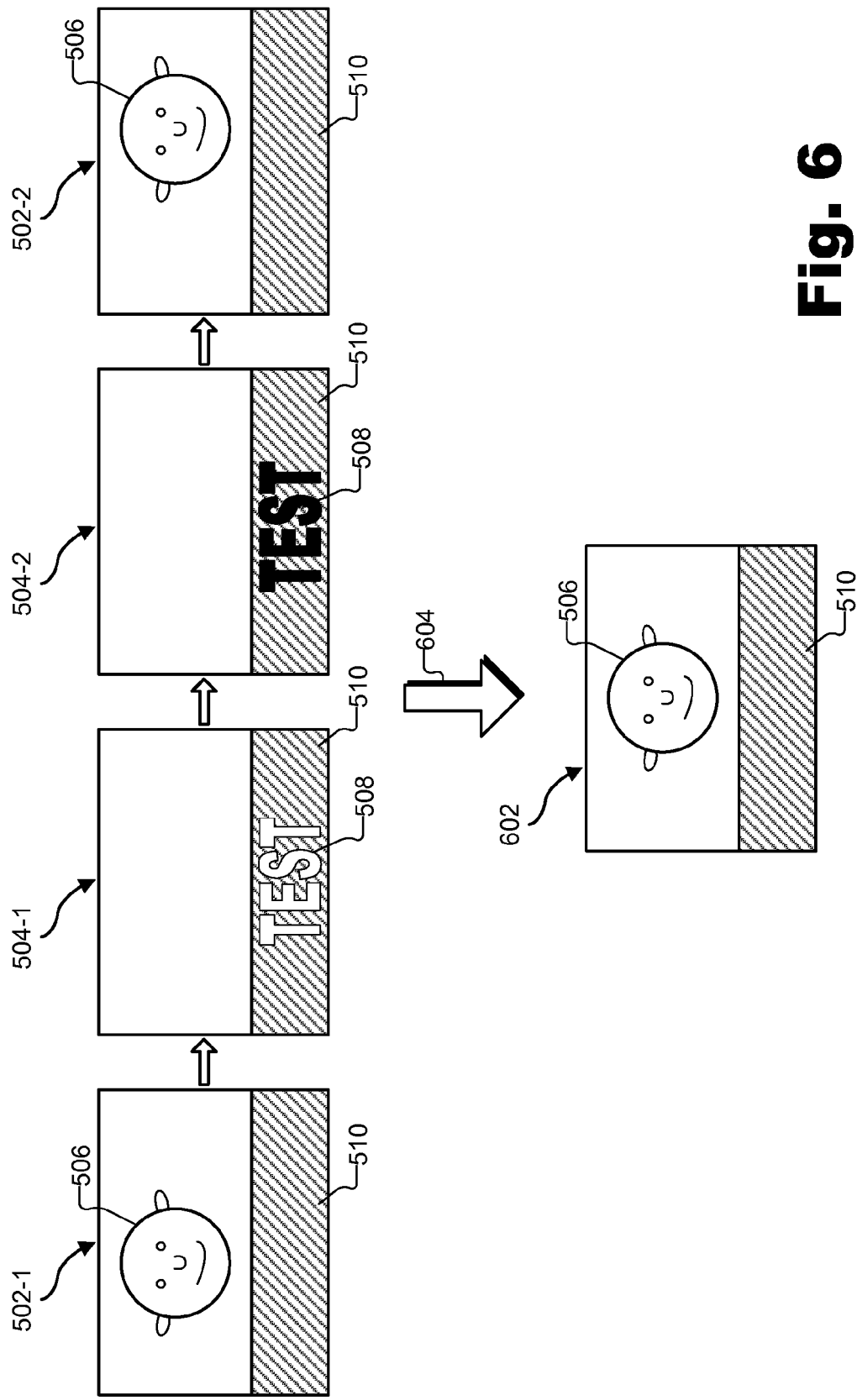
FIG. 6 shows a composite image that may be perceived by a viewer and that does not have perceptible adjunct content included therein according to principles described herein.

As mentioned, adjunct content 508 may be substantially imperceptible to a viewer able to view both adjunct content images 504 during the sequential presentation of first main content image 502-1, first adjunct content image 504-1, second adjunct content image 504-2, and second main content image 502-2. To illustrate, FIG. 6 shows that the sequential presentation of main content images 502 and adjunct content images 504 described in connection with FIG. 5 may cause a viewer able to view both adjunct content images 504 to perceive a single composite image 602 that does not have adjunct content 508 included therein.

In some examples, a viewer may be able to view both adjunct content images 504 if, during the presentation of first main content image 502-1, first adjunct content image 504-1, second adjunct content image 504-2, and second main content image 502-2, the viewer is not wearing active shutter 3D viewing glasses. Without active shutter 3D viewing glasses, both eyes of the viewer may receive both adjunct content images 504. Consequently, the brightness levels of the pixels associated with adjunct content 508 included in each adjunct content image 504 may effectively cancel each other out, thereby rendering adjunct content 508 substantially imperceptible to the viewer.

Figure 7:
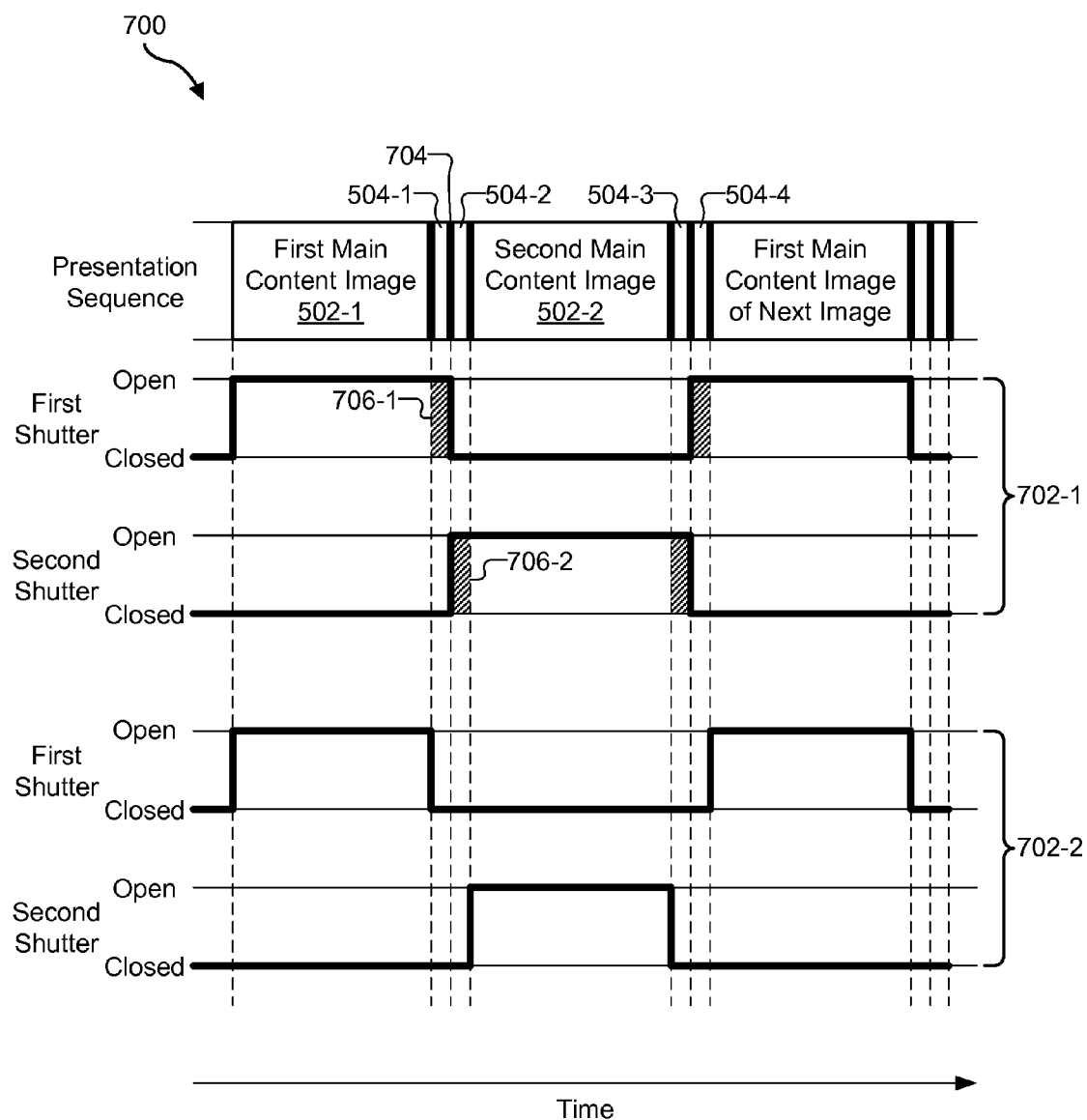
FIG. 7 shows an exemplary timing diagram that illustrates two different duty cycle configurations that may each result in adjunct content being rendered substantially imperceptible to a viewer wearing active shutter 3D viewing glasses according to principles described herein.

Additionally or alternatively, system 100 may render adjunct content 508 substantially imperceptible to a viewer wearing active shutter 3D viewing glasses by appropriately configuring a duty cycle associated with an opening and closing of the shutters that are a part of the active shutter 3D viewing glasses. To illustrate, FIG. 7 shows an exemplary timing diagram 700 that illustrates two different duty cycle configurations 702-1 and 702-2 (collectively "duty cycle configurations 702") that may each result in adjunct content 508 being rendered substantially imperceptible to a viewer wearing active shutter 3D viewing glasses. It will be recognized that duty cycle configurations 702 are merely illustrative of the many different duty cycle configurations that may result in adjunct content 508 being rendered substantially imperceptible to a viewer wearing active shutter 3D viewing glasses.

First main content image 502-1, first adjunct content image 504-1, second adjunct content image 504-2, and second main content image 502-2 may be sequentially and temporally presented in the order shown in FIG. 7. Following the presentation of second main content image 502-2, a third adjunct content image 504-3 comprising adjunct content having a brightness level greater than the predetermined neutral brightness level, a fourth adjunct content image 504-4 comprising adjunct content having a brightness level less than the predetermined neutral brightness level, and a first main content image of a subsequent image may be presented, as shown in FIG. 7. A temporal guard band (illustrated by solid black bars, e.g., solid black bar 704) may separate each image that is presented. It will be recognized that the temporal guard bands are optional and may be of any suitable length as may serve a particular implementation, for example, due to shutter transition times.

As illustrated by duty cycle configuration 702-1, a duty cycle of first and second shutters that are a part of active shutter 3D viewing glasses may be configured to cause a viewer to view both the first and second adjunct content images 504-1 and 504-2. For example, during the sequential presentation of main content images 502 and adjunct content images 504, a viewer may be wearing active shutter 3D viewing glasses, such as or similar to active shutter 3D viewing glasses 306. As illustrated by active duty cycle configuration 702-1, system 100 may direct a first shutter (e.g., a left shutter associated with a left lens of the active shutter 3D viewing glasses) to be open during the presentation of first main content image 502-1 and first adjunct content image 504-1 and closed during the presentation of second adjunct content image 504-2 and second main content image 502-2. Likewise, system 100 may direct a second shutter (e.g., a right shutter associated with a right lens of the active shutter 3D viewing glasses) to be closed during the presentation of first main content image 502-1 and first adjunct content image 504-1 and open during the presentation of second adjunct content image 504-2 and second main content image 502-2. As illustrated in FIG. 7 by shaded areas 706-1 and 706-2, the viewer is able to see both adjunct content images 504 through the active shutter 3D viewing glasses, even though only one of the adjunct content images 504 is presented to each eye of the viewer. As a result, the brightness levels of the pixels associated with adjunct content 508 included in each adjunct content image 504 may effectively cancel each other out, thereby rendering adjunct content 508 substantially imperceptible to the viewer.

Alternatively, as illustrated by duty cycle configuration 702-2, a duty cycle of first and second shutters that are a part of active shutter 3D viewing glasses may be configured to cause a viewer to not view either of the first and second adjunct content images 504-1 and 504-2 and thereby not perceive adjunct content 508. For example, system 100 may direct a first shutter (e.g., a left shutter associated with a left lens of the active shutter 3D viewing glasses) to be open during the presentation of first main content image 502-1 and closed during the presentation of first adjunct content image 504-1, second adjunct content image 504-2, and second main content image 502-2. Likewise, system 100 may direct a second shutter (e.g., a right shutter associated with a right lens of the active shutter 3D viewing glasses) to be closed during the presentation of first main content image 504-1, first adjunct content image 504-1, and second adjunct content image 504-2, and open during the presentation of second main content image 502-2. In this manner, a viewer may view a media content instance represented by main content images 502 in 3D without perceiving adjunct content 508.

Figure 8:
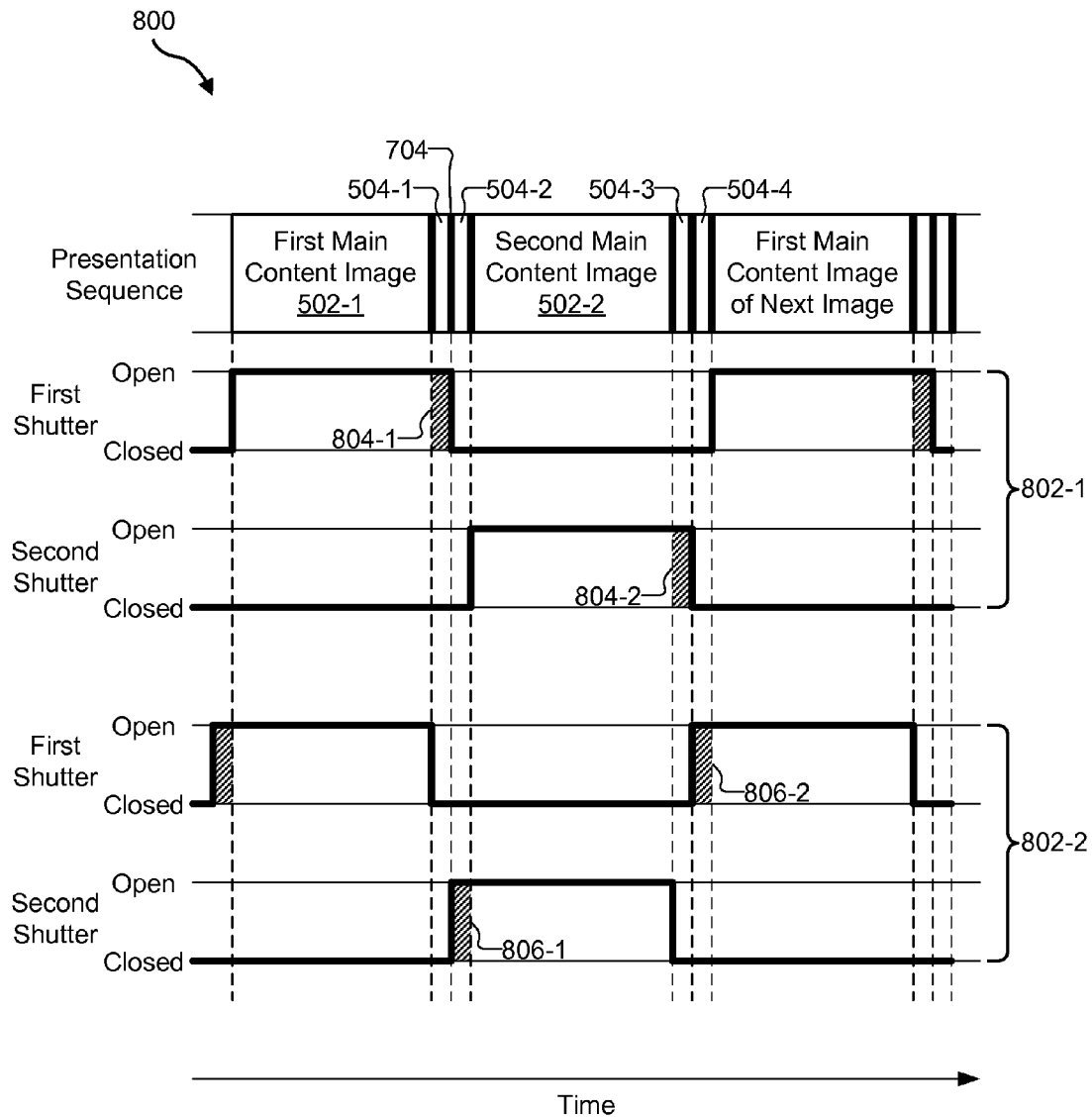
FIG. 8 shows an exemplary timing diagram that illustrates two different duty cycle configurations that may each result in adjunct content being perceived by a viewer wearing active shutter 3D viewing glasses according to principles described herein.

Additionally or alternatively, system 100 may facilitate perception of adjunct content 508 by a viewer wearing active shutter 3D viewing glasses by appropriately configuring a duty cycle associated with an opening and closing of the shutters that are a part of the active shutter 3D viewing glasses. To illustrate, FIG. 8 shows an exemplary timing diagram 800 that illustrates two different duty cycle configurations 802-1 and 802-2 (collectively "duty cycle configurations 802") that may each result in adjunct content 508 being perceived by a viewer wearing active shutter 3D viewing glasses. For example, as will be described below, duty cycle configuration 802-1 may be configured to allow a user to perceive adjunct content having a brightness level greater than the predetermined neutral brightness level and duty cycle configuration 802-2 may be configured to allow a user to perceive adjunct content having a brightness level less than the predetermined neutral brightness level. It will be recognized that duty cycle configurations 802 are merely illustrative of the many different duty cycle configurations that may result in adjunct content 508 being perceived by a viewer wearing active shutter 3D viewing glasses.

As described in connection with FIG. 7, first main content image 502-1, first adjunct content image 504-1, second adjunct content image 504-2, and second main content image 502-2 may be sequentially and temporally presented in the order shown in FIG. 8. In accordance with duty cycle configuration 802-1, system 100 may direct a first shutter (e.g., a left shutter associated with a left lens of the active shutter 3D viewing glasses) to be open during the presentation of first main content image 502-1 and first adjunct content image 504-1 and closed during the presentation of second adjunct content image 504-2 and second main content image 502-2. Likewise, system 100 may direct a second shutter (e.g., a right shutter associated with a right lens of the active shutter 3D viewing glasses) to be closed during the presentation of first main content image 502-1, first adjunct content image 504-1, and second adjunct content image 504-2, and open during the presentation of second main content image 502-2. As further illustrated in FIG. 8, system 100 may direct the first shutter to remain closed and the second shutter to remain open during the presentation of third adjunct content image 504-3. The process may be repeated for main content images and adjunct content images that are subsequently presented.

Hence, as illustrated by shaded area 804-1, for example, only one of the shutters (i.e., the first shutter) is open during the presentation of first adjunct content image 504-1 and neither of the shutters is open during the presentation of second adjunct content image 504-2. Likewise, as illustrated by shaded area 804-2, only one of the shutters (i.e., the second shutter) is open during the presentation of third adjunct content image 504-3 and neither of the shutters is open during the presentation of fourth adjunct content image 504-4. In this manner, second adjunct content image 504-2 is prevented from canceling out first adjunct content image 504-1 and fourth adjunct content image 504-4 is prevented from canceling out third adjunct content image 504-3. Hence, the viewer may, with both eyes, perceive adjunct content having a brightness level greater than the predetermined neutral brightness level.

Figure 9:
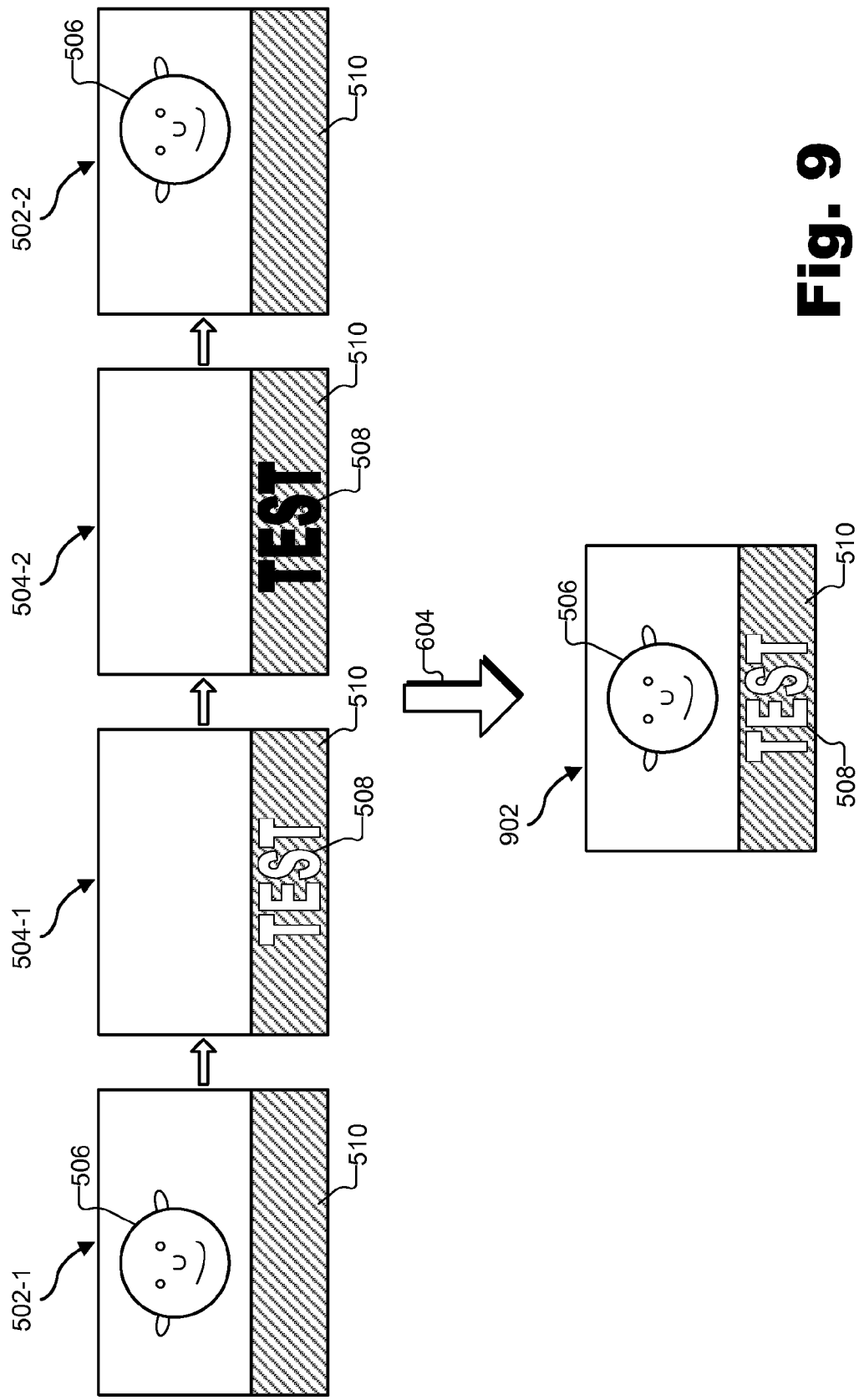
FIG. 9 shows a composite image that includes perceptible adjunct content having a brightness level greater than a predetermined neutral brightness level according to principles described herein.

To illustrate, FIG. 9 shows a composite image 902 that may be perceived by a viewer when system 100 directs the shutters that are a part of active shutter 3D viewing glasses to operate in accordance with duty cycle configuration 802-1. As shown in FIG. 9, the resulting composite image 902 includes adjunct content 508 having a brightness level greater than the predetermined neutral brightness level.

Returning to FIG. 8, system 100 may alternatively direct the shutters associated with active shutter 3D viewing glasses to operate in accordance with duty cycle configuration 802-2. For example, as illustrated in FIG. 8, system 100 may direct a first shutter (e.g., a left shutter associated with a left lens of the active shutter 3D viewing glasses) to be open during the presentation of first main content image 502-1 and closed during the presentation of first adjunct content image 504-1, second adjunct content image 504-2, and second main content image 502-2. Likewise, system 100 may direct a second shutter (e.g., a right shutter associated with a right lens of the active shutter 3D viewing glasses) to be closed during the presentation of first main content image 502-1 and first adjunct content image 504-1, and open during the presentation of second adjunct content image 504-2 and second main content image 502-2. As further illustrated in FIG. 8, system 100 may direct the first shutter to be closed during the presentation of third adjunct content image 504-3 and open during the presentation of fourth adjunct content image 504-4. System 100 may likewise direct the second shutter to be closed during the presentation of both the third and fourth adjunct content images 504-3 and 504-4. The process may be repeated for main content images and adjunct content images that are subsequently presented.

Hence, as illustrated by shaded area 806-1, for example, neither of the shutters is open during the presentation of first adjunct content image 504-1 and only one of the shutters is open during the presentation of second adjunct content image 504-2. Likewise, as illustrated by shaded area 806-2, neither of the shutters is open during the presentation of third adjunct content image 504-3 and only one of the shutters (i.e., the first shutter) is open during the presentation of fourth adjunct content image 504-4. In this manner, first adjunct content image 504-1 is prevented from canceling out second adjunct content image 504-2 and third adjunct content image 504-3 is prevented from canceling out fourth adjunct content image 504-4. Hence, the viewer may, with both eyes, perceive adjunct content having a brightness level less than the predetermined neutral brightness level.

Figure 10:
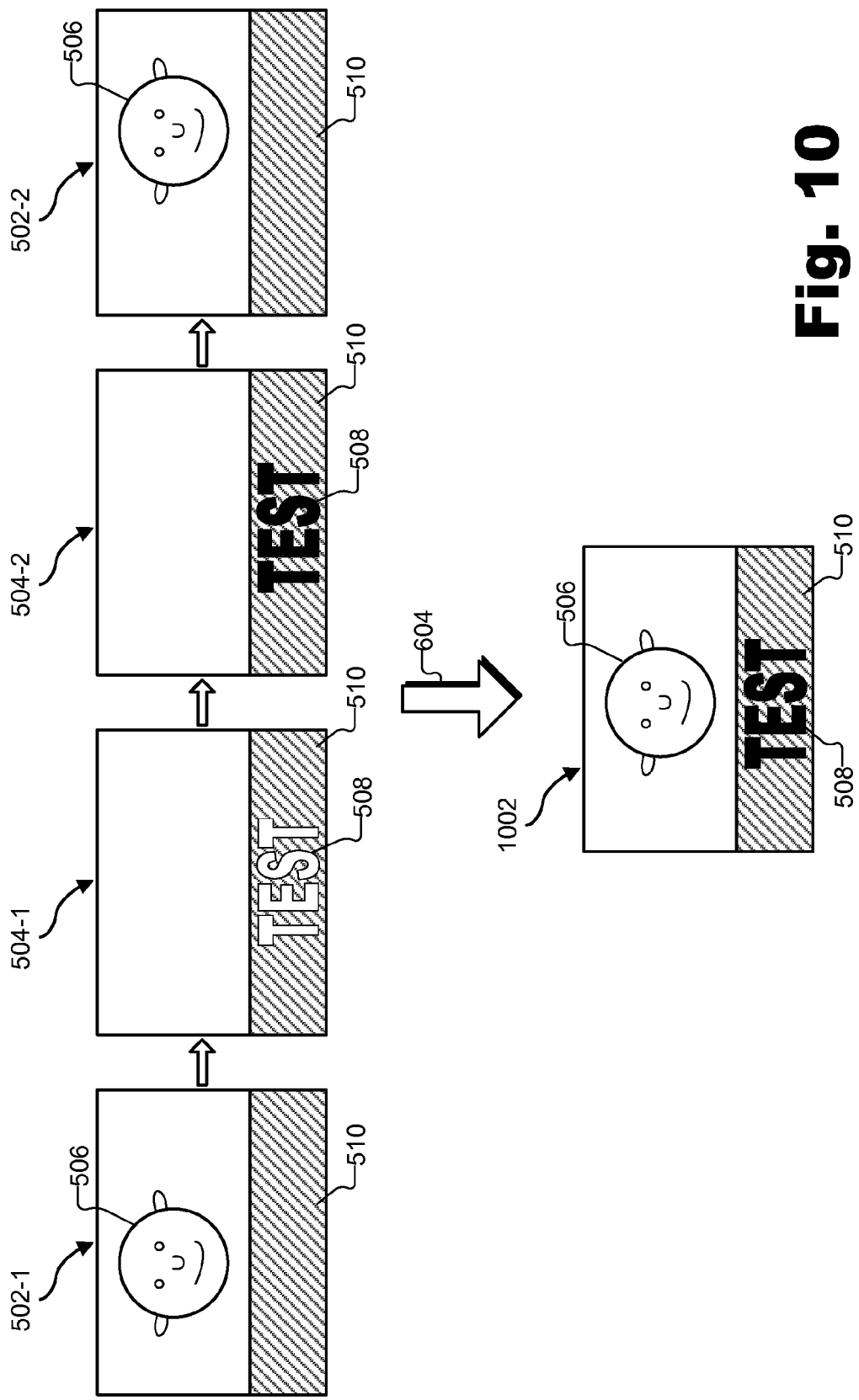
FIG. 10 shows a composite image that includes perceptible adjunct content having a brightness level less than a predetermined neutral brightness level according to principles described herein.

To illustrate, FIG. 10 shows a composite image 1002 that may be perceived by a viewer when system 100 directs the shutters that are a part of active shutter 3D viewing glasses to operate in accordance with duty cycle configuration 802-2. As shown in FIG. 10, the resulting composite image 1002 includes adjunct content 508 having a brightness level less than the predetermined neutral brightness level.

Figure 11:
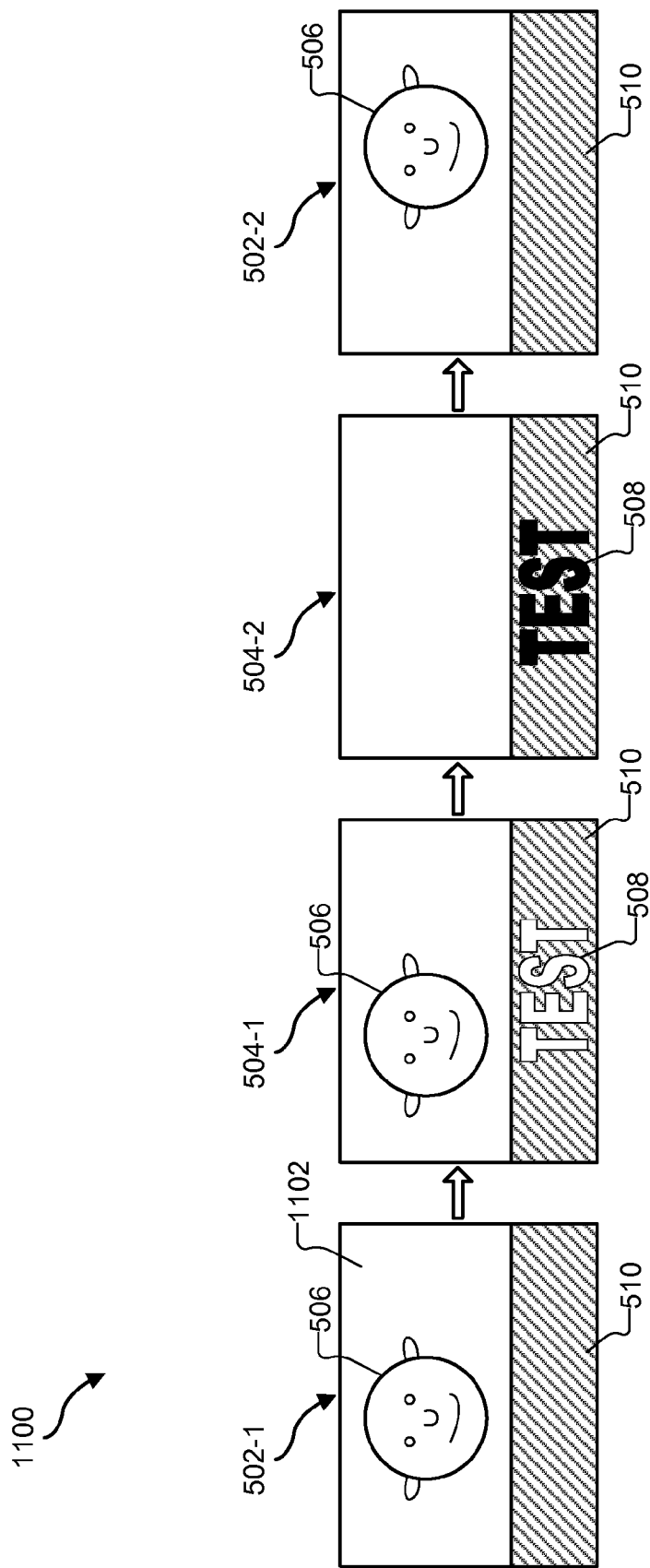
FIG. 11 represents an exemplary presentation scenario in which a first adjunct content image includes the same main content as its preceding first main content image according to principles described herein.

In some examples, adjunct content images presented by system 100 may, in addition to adjunct content, further include main content included in a main content image. For example, FIG. 11 represents an exemplary presentation scenario 1100 in which first adjunct content image 504-1 includes the same main content (e.g., image 506) as its preceding first main content image 502-1. In this manner, flicker may be minimized or avoided during a transition between first main content image 502-1 and first adjunct content image 504-1. While not shown in FIG. 11, it will be recognized that second adjunct content image 504-2 may include the same main content included in second main content image 502-1. Additionally or alternatively, an adjunct content image that precedes first main content image 502-1 in a sequential presentation may include the same main content as first main content image 502-1.

In some examples, performance of system 100 may be enhanced by refreshing only a portion of a display screen during one or more transitions between main content images 502 and adjunct content images 504. For example, with reference to FIG. 11, a display of image 506 included within first main content image 502-1 may be initiated within a first portion of a display screen. The first portion of the display screen may correspond to a portion 1102 of first main content image 502-1 that does not include neutral field 510. While image 506 is still displayed within the first portion of the display screen, a display of adjunct content 508 included in first adjunct content image 504-1 may be initiated within a second portion of the display screen by refreshing only those pixels included in the second portion of the display screen. The second portion of the display screen may be separate from the first portion of the display screen and may correspond to neutral field 510, for example. In this manner, the entire display screen does not need to be refreshed when transitioning between the display of first main content image 502-1 and first adjunct content image 504-1.

Continuing with this example, adjunct content 508 included in first adjunct content image 504-1 may be replaced with adjunct content 508 included in second adjunct content image 504-2 by refreshing only the second portion of the display screen. Once again, only those pixels included in the second portion of the display screen may be refreshed when transitioning between the display of first adjunct content image 504-1 and second adjunct content image 504-2. When the time comes for second main content image 502-2 to be displayed within the display screen, all of the pixels included in the display screen may be refreshed.

In some examples, system 100 may automatically facilitate perception of adjunct content by a viewer wearing active shutter 3D viewing glasses in response to the adjunct content meeting at least one predetermined criterion. For example, a viewer may be watching a media content instance while wearing active shutter 3D glasses configured to operate in accordance with duty cycle configuration 702-2. As described above, duty cycle configuration 702-2 may allow the viewer to view the media content instance in 3D without perceiving adjunct content. However, system 100 may be configured to automatically direct the viewer's active shutter 3D viewing glasses to operate in accordance with duty cycle configuration 802-1 or duty cycle configuration 802-2 (which, as described above, both facilitate viewer perception of adjunct content) in response to the adjunct content meeting at least one predetermined criterion. In some examples, the at least one predetermined criterion may be specified by the viewer (e.g., by way of a graphical user interface provided by system 100 and/or by selecting one or more options provided by the active shutter 3D viewing glasses). For example, the viewer may specify that an incoming phone call from a certain telephone number (e.g., a telephone number associated with a family member of the viewer) results in adjunct content containing caller identification information associated with the incoming phone call being perceived by the viewer. Alternatively, the at least one predetermined criterion may be specified by system 100. For example, system 100 may be configured to automatically facilitate perception of adjunct content if the adjunct content includes an emergency notification.

System 100 may be configured to direct active shutter 3D viewing glasses to operate in accordance with any of the duty cycle configurations described herein in any suitable manner as may serve a particular implementation. For example, system 100 may control an operation of the shutters that are a part of the active shutter 3D viewing glasses by way of IR transmitter 304, by way of one or more software-implemented commands, and/or in any other suitable manner. The active shutter 3D viewing may include any suitable combination of components configured to facilitate selective control of a duty cycle associated with the operation of its lenses.

Figure 12:
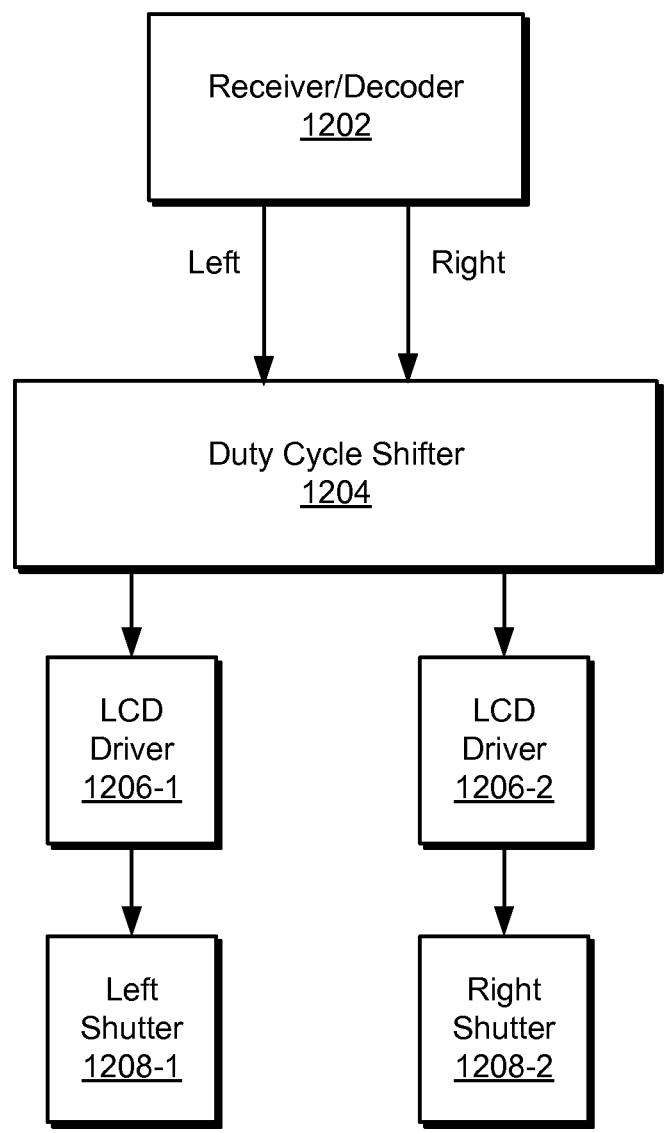
FIG. 12 illustrates exemplary components that may be used to facilitate control of active shutter 3D viewing glasses according to principles described herein.

For example, FIG. 12 illustrates exemplary components that may be included within active shutter 3D viewing glasses that may be used to facilitate control of the active shutter 3D viewing glasses by system 100. As shown in FIG. 12, active shutter 3D viewing glasses may include a receiver/decoder 1202, a duty cycle shifter 1204, liquid crystal display ("LCD") drivers 1206 (e.g., LCD drivers 1206-1 and 1206-2), and left and right shutters 1208-1 and 1208-2 (collectively "shutters 1208"). It will be recognized that receiver/decoder 1202 and/or duty cycle shifter 1204 may be alternatively included in or implemented by system 100, 3D content presentation subsystem 204, 3D content processing device 302, and/or IR transmitter 304.

Figure 13:
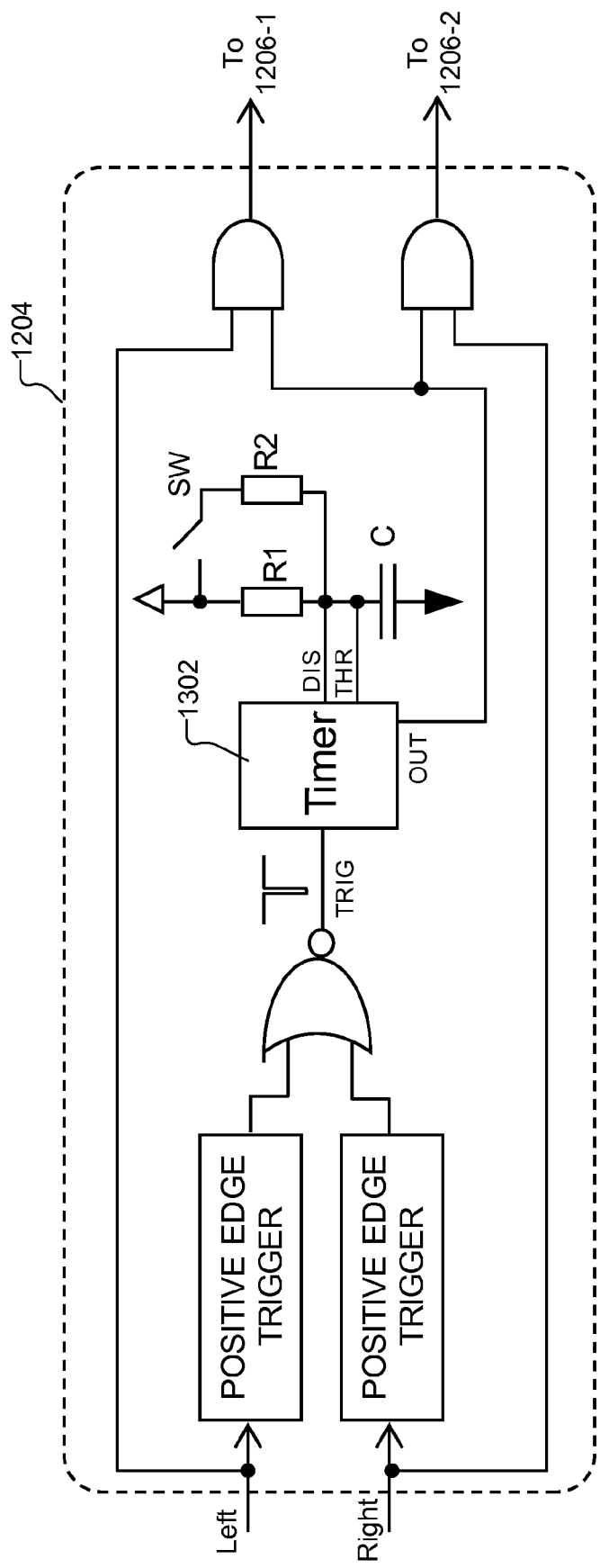
FIG. 13 illustrates exemplary components that may be included in a duty cycle shifter according to principles described herein.

Receiver/decoder 1202 may be configured to receive and/or decode commands transmitted thereto by system 100 (e.g., by way of IR transmitter 304). The commands may be input into duty cycle shifter 1204, which may be configured to adjust a duty cycle of shutters 1208 in accordance with the received commands. Duty cycle shifter 1204 may include any combination of components as may serve a particular implementation. For example, FIG. 13 illustrates exemplary components that may be included in duty cycle shifter 1204. The exemplary components shown in FIG. 13 are merely illustrative of the many different components that may be included in duty cycle shifter 1204. Duty cycle shifter 1204 may output signals configured to control a LCD driver 1206-1 associated with left shutter 1208-1 and a LCD driver 1206-2 associated with right shutter 1208-2. LCD drivers 1206 may be configured to operate in any suitable manner.

With reference to FIGS. 12 and 13, in instances wherein inputs from receiver/decoder 1202 are "active high" inputs to turn on left and right shutters 1208-1 and 1208-2, respectively, duty cycle shifter 1204 detects the positive edge of the input pulses and acts to further control the duration of the signals going to LCD drivers 1206. A timer 1302 (e.g., a 555-type timer circuit) acts as a monostable multivibrator (or a "one-shot") with the output pulse duration being controlled by the RC time constant determined by the values of resistor R1 and capacitor C. These components could be chosen, for example, to achieve operation according to duty cycle configuration 802-1. A switch 'SW' is provided to introduce resistance R2 to shorten the one-shot pulse duration, effectively changing the operation of the shutters to be in accordance with duty cycle configuration 702-2. The switch may be provided as a small switch on the eyewear or may be controlled by a signal sent by IR transmitter 304. Those of ordinary skill in the art will appreciate that the circuitry depicted in FIG. 13 is merely illustrative and that alternative implementations in software, firmware or other circuitry could achieve a desired operation according the general principles of the systems and methods described herein.

An exemplary implementation of the methods and systems described herein will now be described in connection with FIGS. 14-15. It will be recognized that the exemplary implementation described in connection with FIGS. 14-15 is merely illustrative of the many different scenarios in which the methods and systems described herein may be employed.

Figure 14:
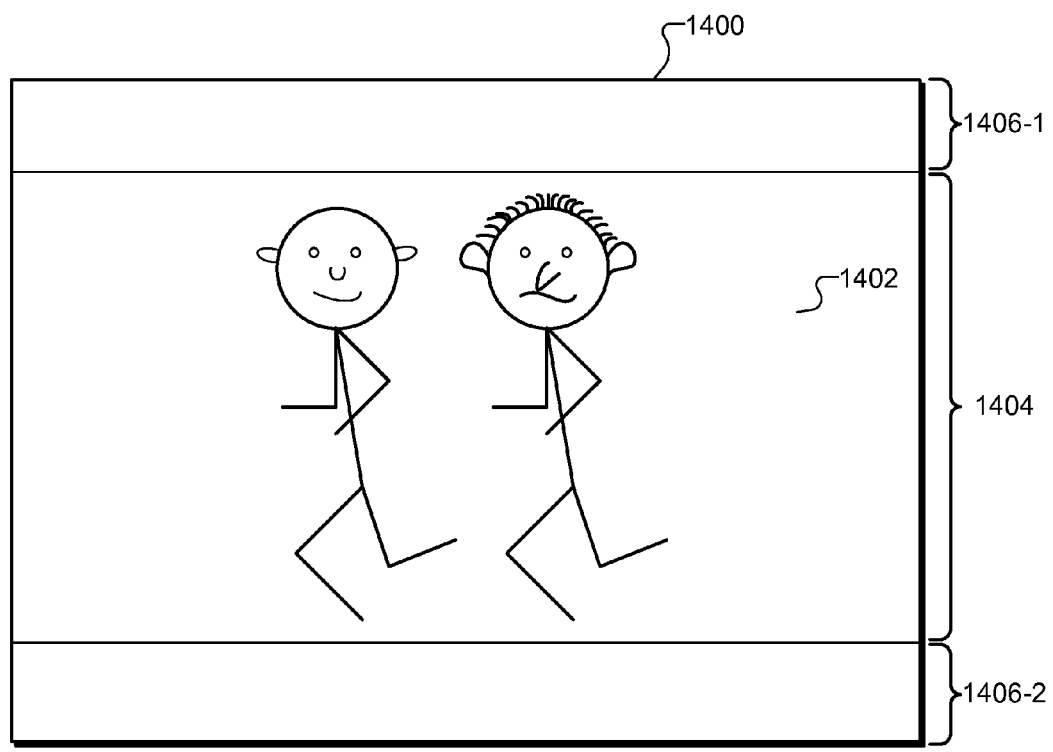
FIG. 14 illustrates an exemplary display screen having a particular scene of a media content instance displayed therein according to principles described herein.
Figure 15:
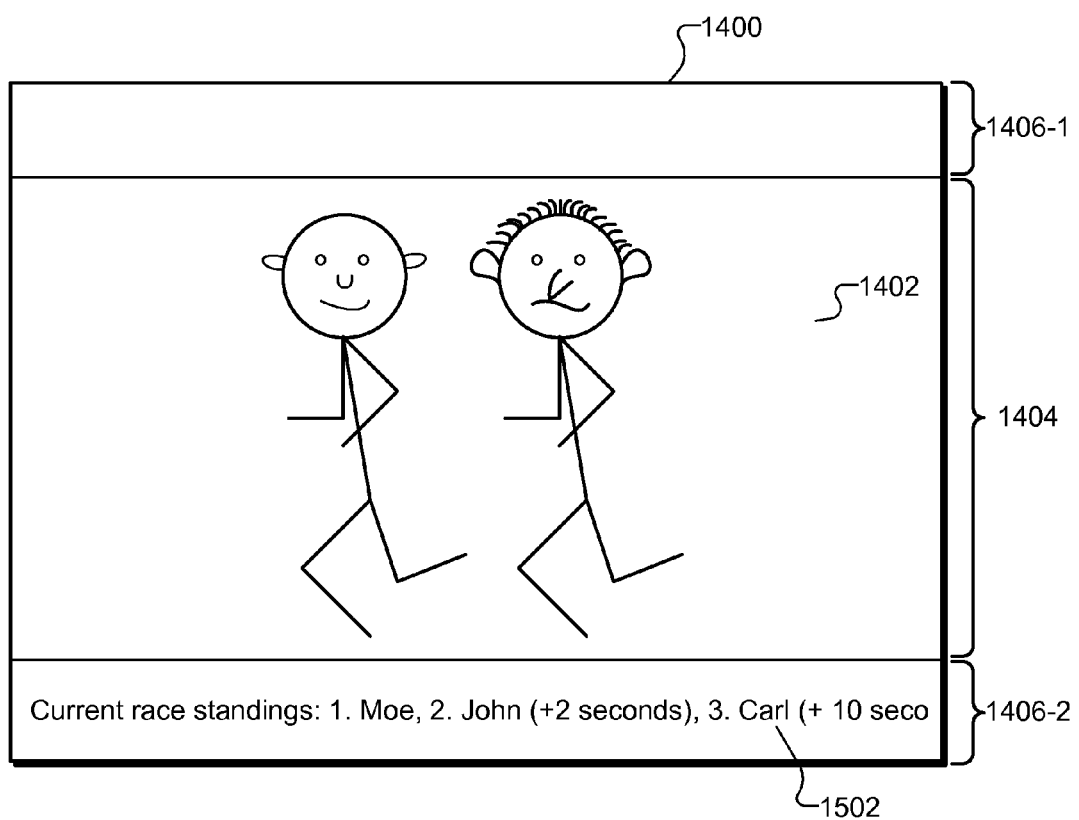
FIG. 15 shows the display screen of FIG. 14 with adjunct content displayed therein according to principles described herein.

FIG. 14 illustrates an exemplary display screen 1400 having a particular scene of a media content instance 1402 (e.g., a live broadcast of a sporting event) displayed therein. As shown in FIG. 14, media content instance 1402 may be displayed within a main content portion 1404 of display screen 1400. Media content instance 1402 may be displayed in 2D or 3D as may serve a particular implementation.

One or more blank portions 1406 (e.g., blank portions 1406-1 and 1406-2) may also be displayed within display screen 1400. Blank portions 1406 may be displayed above and/or below main content portion 1406, as shown in FIG. 14, or at any other location within display screen 1400 as may serve a particular implementation. In some examples, blank portions 1406 may be displayed when the aspect ratio of media content instance 1402 is different than that of display screen 1400. Alternatively, one or more blank portions 1406 may be displayed as specified by system 100.

In some examples, display screen 1400 may be a part of a television device located within a particular household. Two or more members of the household may decide to watch media content instance 1402 within display screen 1400 together. One of the household members (e.g., the wife) may desire to watch media content instance 1402 without concurrently seeing any type of adjunct content within display screen 1400. However, another member of the household (e.g., the husband) may be extremely interested in the media content instance 1402 and therefore desire to see real time statistics or other types of adjunct content related to media content instance 1400. In this scenario, the viewing desires of both household members may be concurrently satisfied by the methods and systems described herein.

To illustrate, media content instance 1402 may be presented in the form of multiple sets of main content images and adjunct content images as described herein. To see the media content instance 1402 without perceiving the adjunct content included in the adjunct content images, the wife may either watch the media content instance 1402 without active shutter 3D viewing glasses or with active shutter 3D viewing glasses configured to operate in accordance with duty cycle configuration 702-1 or duty cycle configuration 702-2. The husband, on the other hand, may perceive the adjunct content by wearing active shutter 3D viewing glasses configured to operate in accordance with duty cycle configuration 802-1 or duty cycle configuration 802-2. Exemplary adjunct content that may be perceived by the husband is shown in FIG. 15. As shown in FIG. 15, adjunct content 1502 may be displayed within blank portion 1406-2. Adjunct content 1502 may be additionally or alternatively displayed at any other location within display screen 1400 as may serve a particular implementation.

Figure 16:
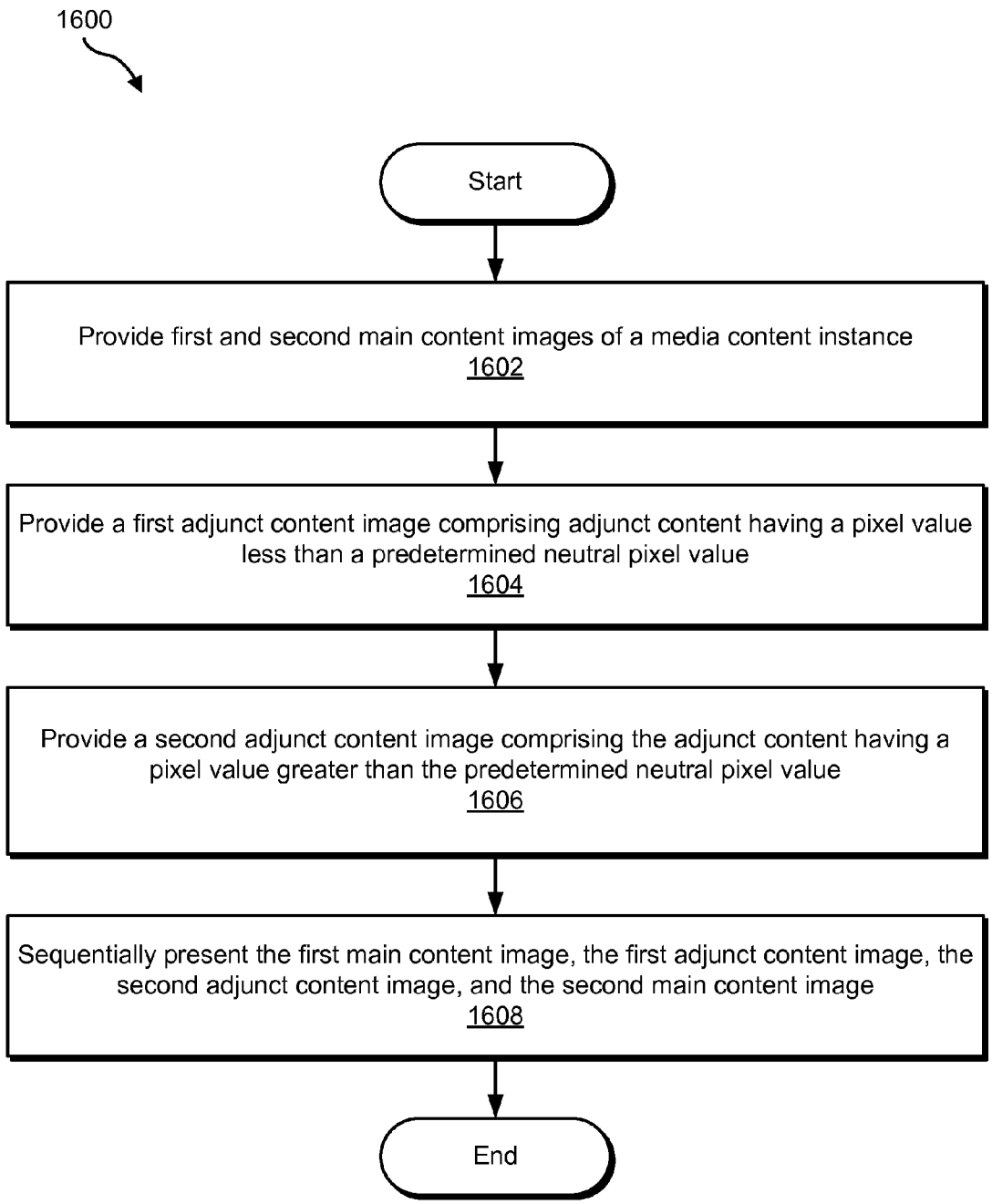
FIG. 16 illustrates another exemplary method of presenting adjunct content during a presentation of a media content instance according to principles described herein.

It will be recognized that the first adjunct content image described herein may alternatively include adjunct content having a pixel value less than a predetermined neutral pixel value and that the second adjunct content image described herein may alternatively include adjunct content having a pixel value greater than a predetermined neutral pixel value. For example, FIG. 16 illustrates another exemplary method 1600 of presenting adjunct content during a presentation of a media content instance. While FIG. 16 illustrates exemplary steps according to one embodiment, other embodiments may omit, add to, reorder, and/or modify any of the steps shown in FIG. 16. The steps shown in FIG. 16 may be performed by any component or combination of components of system 100, media content provider subsystem 202, 3D content presentation subsystem 204, and/or 3D content processing device 302.

In step 1602, first and second main content images of a media content instance are provided. Step 1602 may be performed in any of the ways described herein.

In step 1604, a first adjunct content image comprising adjunct content having a pixel value less than a predetermined neutral pixel value is provided. In some examples, the adjunct content may be included within the first adjunct content image by setting a pixel value of a first group of pixels included in the first adjunct content image to be less than the predetermined neutral pixel value.

In step 1606, a second adjunct content image comprising the adjunct content having a pixel value greater than a predetermined neutral pixel value is provided. In some examples, the adjunct content may be included within the second adjunct content image by setting a pixel value of a second group of pixels included in the second adjunct content image and corresponding to the first group of pixels to be greater than the predetermined neutral pixel value.

In step 1608, the first main content image, the first adjunct content image, the second adjunct content image, and the second main content image are sequentially presented. As described above, the pixel values of the adjunct content included in the first and second adjunct content images provided in steps 1604 and 1606 are configured to result in the adjunct content being perceptible to some viewers while at the same time being substantially imperceptible to other viewers.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 17:
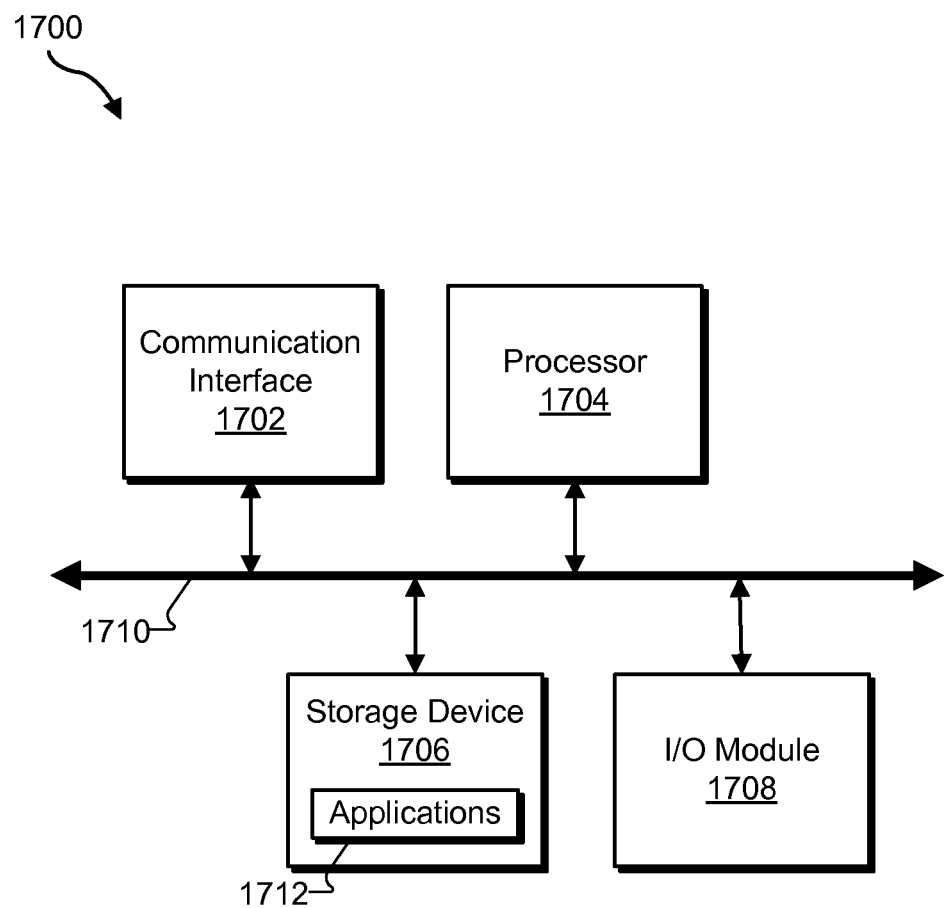
FIG. 17 illustrates an exemplary computing device according to principles described herein.

FIG. 17 illustrates an exemplary computing device 1700 that may be configured to perform one or more of the processes described herein. As shown in FIG. 17, computing device 1700 may include a communication interface 1702, a processor 1704, a storage device 1706, and an input/output ("I/O") module 1708 communicatively connected via a communication infrastructure 1710. While an exemplary computing device 1700 is shown in FIG. 17, the components illustrated in FIG. 17 are not intended to be limiting. Additional or alternative components may be used in other embodiments. Components of computing device 1700 shown in FIG. 17 will now be described in additional detail.

Communication interface 1702 may be configured to communicate with one or more computing devices. Examples of communication interface 1702 include, without limitation, a wired network interface (such as a network interface card), a wireless network interface (such as a wireless network interface card), a modem, an audio/video connection, and any other suitable interface.

Processor 1704 generally represents any type or form of processing unit capable of processing data or interpreting, executing, and/or directing execution of one or more of the instructions, processes, and/or operations described herein. Processor 1704 may direct execution of operations in accordance with one or more applications 1712 or other computer-executable instructions such as may be stored in storage device 1706 or another computer-readable medium.

Storage device 1706 may include one or more data storage media, devices, or configurations and may employ any type, form, and combination of data storage media and/or device. For example, storage device 1706 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1706. For example, data representative of one or more executable applications 1712 (which may include, but are not limited to, one or more of the software applications described herein) configured to direct processor 1704 to perform any of the operations described herein may be stored within storage device 1706. In some examples, data may be arranged in one or more databases residing within storage device 1706.

I/O module 1708 may be configured to receive user input and provide user output and may include any hardware, firmware, software, or combination thereof supportive of input and output capabilities. For example, I/O module 1708 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1708 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1708 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1700. For example, one or more applications 1712 residing within storage device 1706 may be configured to direct processor 1704 to perform one or more processes or functions associated with media content management facility 102, adjunct content management facility 104, and/or presentation facility 106. Likewise, storage facility 108 may be implemented by or within storage device 1706.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   sequentially presenting, by an adjunct content presentation system, a first main content image of a media content instance, a first adjunct content image comprising adjunct content having a pixel value greater than a predetermined neutral pixel value, a second adjunct content image comprising the adjunct content having a pixel value less than the predetermined neutral pixel value, and a second main content image of the media content instance;
   wherein the pixel values of the adjunct content of the first and second adjunct content images are configured to result in the adjunct content being substantially imperceptible to a viewer not wearing active shutter three-dimensional ("3D") viewing glasses during the sequential presentation of the first main content image, the first adjunct content image, the second adjunct content image, and the second main content image.

2. The method of claim 1, wherein:
   the pixel value of the adjunct content included in the first adjunct content image is substantially equal to one pixel value unit greater than the predetermined neutral pixel value; and
   the pixel value of the adjunct content included in the second adjunct content image is substantially equal to one pixel value unit less than the predetermined neutral pixel value.

3. The method of claim 1, further comprising:
   including, by the adjunct content presentation system, the adjunct content in the first adjunct content image by setting a pixel value of a first group of pixels included in the first adjunct content image to be greater than the predetermined neutral pixel value; and
   including, by the adjunct content presentation system, the adjunct content in the second adjunct content image by setting a pixel value of a second group of pixels included in the second adjunct content image and corresponding to the first group of pixels to be less than the predetermined neutral pixel value.

4. The method of claim 1, further comprising facilitating, by the adjunct presentation system, perception of the adjunct content by an additional viewer wearing active shutter 3D viewing glasses by:
   directing a first shutter associated with a first lens of the active shutter 3D viewing glasses worn by the additional viewer to be open during the presentation of the first main content image and the first adjunct content image and closed during the presentation of the second adjunct content image and the second main content image; and
   directing a second shutter associated with a second lens of the active shutter 3D viewing glasses worn by the additional viewer to be closed during the presentation of the first main content image and the first and second adjunct content images and open during the presentation of the second main content image.

5. The method of claim 4, wherein the first lens comprises a left lens associated with a left eye of the additional viewer and the second lens comprises a right lens associated with a right eye of the additional viewer.

6. The method of claim 4, wherein the first lens comprises a right lens associated with a right eye of the additional viewer and the second lens comprises a left lens associated with a left eye of the additional viewer.

7. The method of claim 4, further comprising:
   sequentially presenting, by the adjunct content presentation system following the presentation of the second main content image, a third adjunct content image comprising additional adjunct content having a pixel value greater than the predetermined neutral pixel value and a fourth adjunct content image comprising the additional adjunct content having a pixel value less than the predetermine neutral pixel value;

directing, by the adjunct content presentation system, the first shutter to be closed during the presentation of the third and fourth adjunct content images; and directing, by the adjunct content presentation system, the second shutter to be open during the presentation of the third adjunct content image and closed during the presentation of the fourth adjunct content image.

8. The method of claim 1, further comprising facilitating, by the adjunct presentation system, perception of the adjunct content by an additional viewer wearing active shutter 3D viewing glasses by:

directing a first shutter associated with a first lens of the active shutter 3D viewing glasses worn by the additional viewer to be open during the presentation of the first main content image and closed during the presentation of the first adjunct content image, the second adjunct content image, and the second main content image; and directing a second shutter associated with a second lens of the active shutter 3D viewing glasses worn by the additional viewer to be closed during the presentation of the first main content image and the first adjunct content image and open during the presentation of the second adjunct content image and the second main content image.

9. The method of claim 1, wherein the first and second main content images represent three-dimensional ("3D") content, and wherein the method further comprises allowing, by the adjunct content presentation system, an additional viewer wearing active shutter 3D viewing glasses to view the 3D content without perceiving the adjunct content by:

directing a first shutter associated with a first lens of the active shutter 3D viewing glasses worn by the additional viewer to be open during the presentation of the first main content image and closed during the presentation of the first adjunct content image, the second adjunct content image, and the second main content image; and directing a second shutter associated with a second lens of the active shutter 3D viewing glasses worn by the additional viewer to be closed during the presentation of the first main content image, the first adjunct content image, and the second adjunct content image and open during the presentation of the second main content image.

10. The method of claim 1, wherein the first adjunct content image further comprises an image included in the first main content image.

11. The method of claim 1, wherein the second adjunct content image further comprises an image included in the second main content image.

12. The method of claim 1, wherein the sequentially presenting comprises:

initiating a display of main content included in the first main content image within a first portion of a display screen;

initiating, while the main content included in the first main content image is displayed within the first portion of the display screen, a display of the adjunct content included in the first adjunct content image within a second portion of the display screen separate from the first portion by refreshing only the second portion of the display screen.

13. The method of claim 12, wherein the sequentially presenting further comprises:

replacing the adjunct content displayed within the second portion of the display screen with the adjunct content included in the second adjunct content image by again refreshing only the second portion of the display screen.

14. The method of claim 13, wherein the sequentially presenting further comprises:

replacing the content displayed within the first portion of the display screen with content included in the second main content image and removing the adjunct content displayed within the second portion of the display screen by concurrently refreshing both the first and second portions of the display screen.

15. The method of claim 1, wherein the adjunct content comprises at least one of subtitle content, text messaging content, and ticker tape content.

16. The method of claim 1, wherein the pixel value of the adjunct content included in the first adjunct content image represents a brightness level of the adjunct content included in the first adjunct content image and the pixel value of the adjunct content included in the second adjunct content image represents a brightness level of the adjunct content included in the second adjunct content image.

17. The method of claim 1, embodied as computer-executable instructions on at least one non-transitory computer-readable medium.

18. A method comprising:

sequentially presenting, by an adjunct content presentation system, a first main content image of a media content instance, a first adjunct content image comprising adjunct content having a pixel value less than a predetermined neutral pixel value, a second adjunct content image comprising the adjunct content having a pixel value greater than the predetermined neutral pixel value, and a second main content image of the media content instance;

wherein the pixel values of the adjunct content of the first and second adjunct content images are configured to result in the adjunct content being substantially imperceptible to a viewer not wearing active shutter three-dimensional ("3D") viewing glasses during the sequential presentation of the first main content image, the first adjunct content image, the second adjunct content image, and the second main content image.

19. The method of claim 18, further comprising facilitating, by the adjunct presentation system, perception of the adjunct content by an additional viewer wearing active shutter 3D viewing glasses by:

directing a first shutter associated with a first lens of the active shutter 3D viewing glasses worn by the additional viewer to be open during the presentation of the first main content image and the first adjunct content image and closed during the presentation of the second adjunct content image and the second main content image; and directing a second shutter associated with a second lens of the active shutter 3D viewing glasses worn by the additional viewer to be closed during the presentation of the first main content image and the first and second adjunct content images and open during the presentation of the second main content image.

20. The method of claim 18, embodied as computer-executable instructions on at least one non-transitory computer-readable medium.

21. A system comprising:

an adjunct content management facility configured to provide a first adjunct content image comprising adjunct content having a pixel value greater than a predetermined neutral pixel value and a second adjunct content image comprising the adjunct content having a pixel value less than the predetermined neutral pixel value; and a presentation facility communicatively coupled to the adjunct content management facility and configured to sequentially present a first main content image of a media content instance, the first adjunct content image, the second adjunct content image, and a second main content image of the media content instance;

wherein the pixel values of the adjunct content of the first and second adjunct content images are configured to result in the adjunct content being substantially imperceptible to a viewer not wearing active shutter three-dimensional ("3D") viewing glasses during the sequential presentation of the first main content image, the first adjunct content image, the second adjunct content image, and the second main content image.

22. The system of claim 21, wherein the adjunct content management facility is further configured to facilitate perception of the adjunct content by an additional viewer wearing active shutter 3D viewing glasses by:

directing a first shutter associated with a first lens of the active shutter 3D viewing glasses worn by the additional viewer to be open during the presentation of the first main content image and the first adjunct content image and closed during the presentation of the second adjunct content image and the second main content image; and directing a second shutter associated with a second lens of the active shutter 3D viewing glasses worn by the additional viewer to be closed during the presentation of the first main content image and the first and second adjunct content images and open during the presentation of the second main content image.

* * * * *